United States Patent [19]

Ibaraki

[11] Patent Number: 5,893,895
[45] Date of Patent: Apr. 13, 1999

[54] CONTROL SYSTEM FOR HYBRID VEHICLE

[75] Inventor: Shigeru Ibaraki, Wako, Japan

[73] Assignee: Honda Giken Kogyo Kabushiki Kaisha, Tokyo, Japan

[21] Appl. No.: 08/905,168

[22] Filed: Aug. 1, 1997

[30]      Foreign Application Priority Data

Aug. 2, 1996  [JP]  Japan ..................... 8-204531

[51] Int. Cl.$^6$ ..................... B60K 6/00; B60K 6/04
[52] U.S. Cl. ..................... 701/57; 701/40; 701/68; 701/77
[58] Field of Search ..................... 180/65.2, 653; 290/45, 50; 701/40, 57, 54, 58, 71, 77, 68

[56]           References Cited

U.S. PATENT DOCUMENTS

| | | | |
|---|---|---|---|
| 3,791,473 | 2/1974 | Rosen | 180/65 |
| 5,053,632 | 10/1991 | Suzuki et al. | 290/45 |
| 5,081,365 | 1/1992 | Field et al. | 290/45 |
| 5,172,006 | 12/1992 | Suzuki et al. | 290/45 |
| 5,343,970 | 9/1994 | Severinsky | 180/65 |
| 5,358,317 | 10/1994 | Cikanek | 701/77 |
| 5,508,924 | 4/1996 | Yamashita | 701/22 |
| 5,608,308 | 3/1997 | Kiuchi et al. | 322/11 |
| 5,614,809 | 3/1997 | Kiuchi et al. | 322/11 |
| 5,621,304 | 4/1997 | Kiuchi et al. | 322/18 |
| 5,786,640 | 7/1998 | Sakai et al. | 180/65.2 |

FOREIGN PATENT DOCUMENTS

| | | |
|---|---|---|
| 0 555 482 A1 | of 1992 | European Pat. Off. . |
| 6-1925 | of 1994 | Japan . |
| WO 95/32100 | 11/1995 | WIPO . |

*Primary Examiner*—V Lissi Mojica
*Attorney, Agent, or Firm*—Lyon & Lyon LLP

[57]           ABSTRACT

A hybrid vehicle includes an engine for producing propulsive forces, an electric motor for selectively generating assistive drive forces in addition to the propulsive forces and generating electric energy converted from the propulsive forces, and an energy storage unit for selectively supplying electric energy to the electric motor and storing electric energy converted by the electric motor. A control system for the hybrid vehicle includes an accelerated/decelerated state detecting unit for detecting an accelerated/decelerated state of the hybrid vehicle, a memory for storing a plurality of fuzzy rules and membership functions to determine an operating state of the electric motor from the accelerated/decelerated state according to a fuzzy inference process, a goodness-of-fit calculator for determining respective goodnesses of fit of the fuzzy rules based on the membership functions from the accelerated/decelerated state as detected by the accelerated/decelerated state detecting unit, a goodness-of-fit combiner for combining the goodnesses of fit as determined by the goodness-of-fit calculating unit to determine an operating state of the motor, and a motor controller for controlling the electric motor based on the operating state of the motor as determined by the goodness-of-fit combiner.

17 Claims, 18 Drawing Sheets

FIG. 3

| | PREMISE (IF)<br>(ACCELERATED/DECELERATED STATE & STORED ENERGY STATE) | CONCLUSION (THEN)<br>(MOTOR OPERATING STATE) |
|---|---|---|
| 1 | $\Delta\theta_{Th}$=+LARGE (ACCELERATION: LARGE)<br>& DOD=SMALL~MEDIUM (STORED ENERGY: MEDIUM~LARGE) | $P_{MOT}$=+LARGE<br>(ASSISTIVE FORCE: LARGE) |
| 2 | $\Delta\theta_{Th}$=+MEDIUM (ACCELERATION: MEDIUM)<br>& DOD=SMALL~MEDIUM (STORED ENERGY: MEDIUM~LARGE) | $P_{MOT}$=+MEDIUM<br>(ASSISTIVE FORCE: MEDIUM) |
| 3 | $\Delta\theta_{Th}$=+SMALL (ACCELERATION: SMALL)<br>& DOD=SMALL~MEDIUM (STORED ENERGY: MEDIUM~LARGE) | $P_{MOT}$=+SMALL<br>(ASSISTIVE FORCE: SMALL) |
| 4 | $\Delta\theta_{Th}$=+LARGE (ACCELERATION: LARGE)<br>& DOD=LARGE (STORED ENERGY: SMALL) | $P_{MOT}$=0<br>(ASSISTIVE FORCE: 0) |
| 5 | $\Delta\theta_{Th}$=+MEDIUM (ACCELERATION: MEDIUM)<br>& DOD=LARGE (STORED ENERGY: SMALL) | $P_{MOT}$=0<br>(ASSISTIVE FORCE: 0) |
| 6 | $\Delta\theta_{Th}$=+SMALL (ACCELERATION: SMALL)<br>& DOD=LARGE (STORED ENERGY: SMALL) | $P_{MOT}$=0<br>(ASSISTIVE FORCE: 0) |
| 7 | $\Delta\theta_{Th}$=−LARGE (DECELERATION: LARGE)<br>& DOD=LARGE~MEDIUM (STORED ENERGY: SMALL~MEDIUM) | $P_{MOT}$=−LARGE<br>(REGENERATED ENERGY: LARGE) |
| 8 | $\Delta\theta_{Th}$=−MEDIUM (DECELERATION: MEDIUM)<br>& DOD=LARGE~MEDIUM (STORED ENERGY: SMALL~MEDIUM) | $P_{MOT}$=−MEDIUM<br>(REGENERATED ENERGY: MEDIUM) |
| 9 | $\Delta\theta_{Th}$=−SMALL (DECELERATION: SMALL)<br>& DOD=LARGE~MEDIUM (STORED ENERGY: SMALL~MEDIUM) | $P_{MOT}$=−SMALL<br>(REGENERATED ENERGY: SMALL) |
| 10 | $\Delta\theta_{Th}$=−LARGE (DECELERATION: LARGE)<br>& DOD=SMALL (STORED ENERGY: LARGE) | $P_{MOT}$=0<br>(REGENERATED ENERGY: 0) |
| 11 | $\Delta\theta_{Th}$=−MEDIUM (DECELERATION: MEDIUM)<br>& DOD=SMALL (STORED ENERGY: LARGE) | $P_{MOT}$=0<br>(REGENERATED ENERGY: 0) |
| 12 | $\Delta\theta_{Th}$=−SMALL (DECELERATION: SMALL)<br>& DOD=SMALL (STORED ENERGY: LARGE) | $P_{MOT}$=0<br>(REGENERATED ENERGY: 0) |
| 13 | $\Delta\theta_{Th}\approx$0 & $V_{CAR}$=LARGE (HIGH-SPEED CRUISING)<br>& DOD=LARGE~MEDIUM (STORED ENERGY: SMALL~MEDIUM) | $P_{MOT}$=−LARGE<br>(REGENERATED ENERGY: LARGE) |
| 14 | $\Delta\theta_{Th}\approx$0 & $V_{CAR}$=MEDIUM (MEDIUM-SPEED CRUISING)<br>& DOD=LARGE~MEDIUM (STORED ENERGY: SMALL~MEDIUM) | $P_{MOT}$=−MEDIUM<br>(REGENERATED ENERGY: MEDIUM) |
| 15 | $\Delta\theta_{Th}\approx$0 & $V_{CAR}$=SMALL (LOW-SPEED CRUISING)<br>& DOD=LARGE~MEDIUM (STORED ENERGY: SMALL~MEDIUM) | $P_{MOT}$=−SMALL<br>(REGENERATED ENERGY: SMALL) |
| 16 | $\Delta\theta_{Th}\approx$0 & $V_{CAR}$=LARGE (HIGH-SPEED CRUISING)<br>& DOD=SMALL (STORED ENERGY: LARGE) | $P_{MOT}$=0<br>(REGENERATED ENERGY: 0) |
| 17 | $\Delta\theta_{Th}\approx$0 & $V_{CAR}$=MEDIUM (MEDIUM-SPEED CRUISING)<br>& DOD=SMALL (STORED ENERGY: LARGE) | $P_{MOT}$=0<br>(REGENERATED ENERGY: 0) |
| 18 | $\Delta\theta_{Th}\approx$0 & $V_{CAR}$=SMALL (LOW-SPEED CRUISING)<br>& DOD=SMALL (STORED ENERGY: LARGE) | $P_{MOT}$=0<br>(REGENERATED ENERGY: 0) |

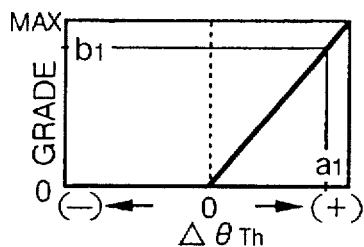
FIG. 4 (a) (RULE NO.1)
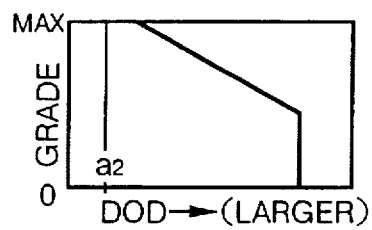
FIG. 4 (b) (RULE NO.1)
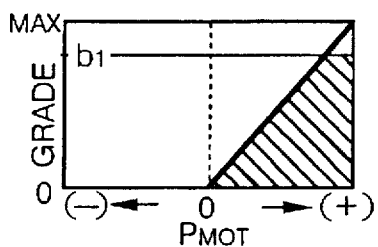
FIG. 4 (c) (RULE NO.1)
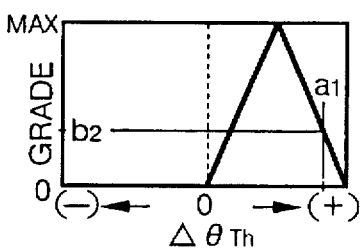
FIG. 5 (a) (RULE NO.2)
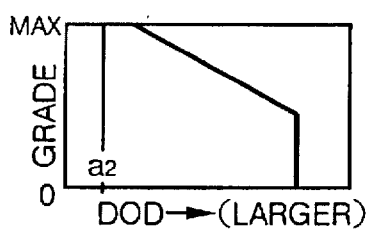
FIG. 5 (b) (RULE NO.2)
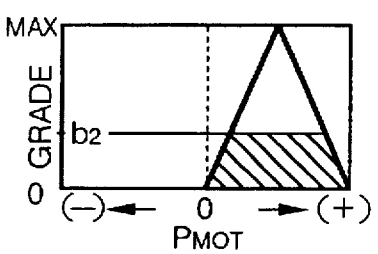
FIG. 5 (c) (RULE NO.2)
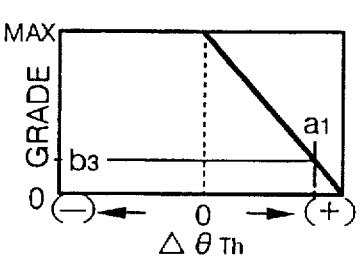
FIG. 6 (a) (RULE NO.3)
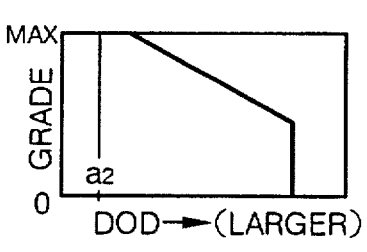
FIG. 6 (b) (RULE NO.3)
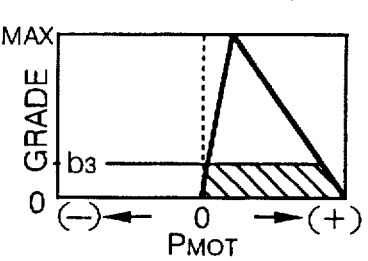
FIG. 6 (c) (RULE NO.3)

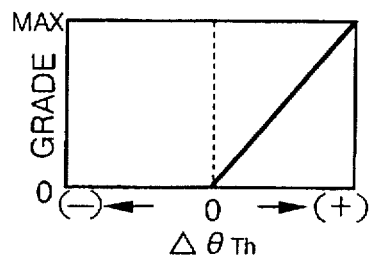
FIG. 7 (a) (RULE NO.4)
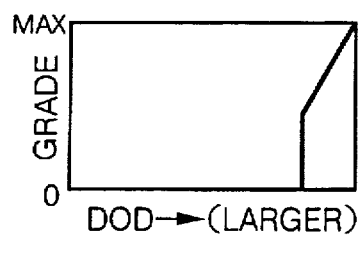
FIG. 7 (b) (RULE NO.4)
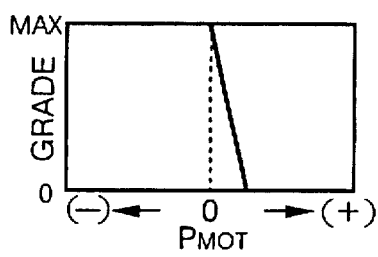
FIG. 7 (c) (RULE NO.4)
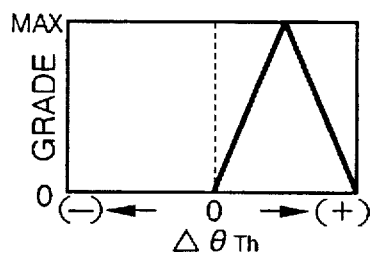
FIG. 8 (a) (RULE NO.5)
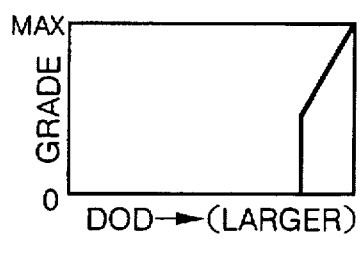
FIG. 8 (b) (RULE NO.5)
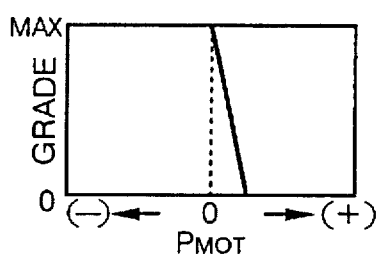
FIG. 8 (c) (RULE NO.5)
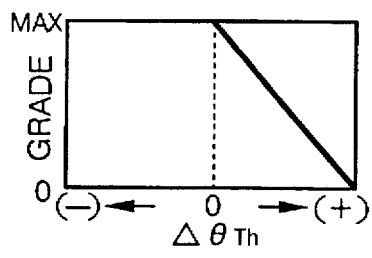
FIG. 9 (a) (RULE NO.6)
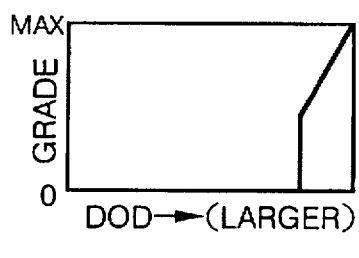
FIG. 9 (b) (RULE NO.6)
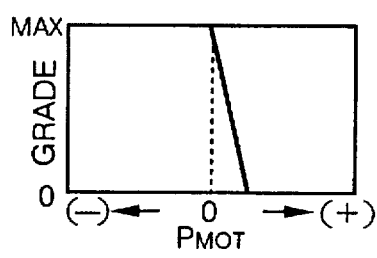
FIG. 9 (c) (RULE NO.6)

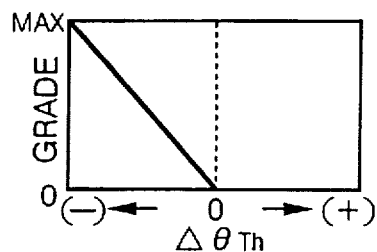
FIG.10 (a) (RULE NO.7)
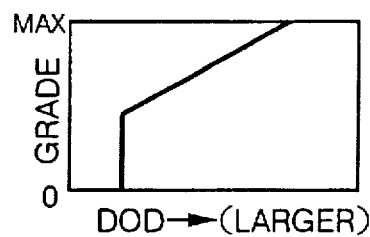
FIG.10 (b) (RULE NO.7)
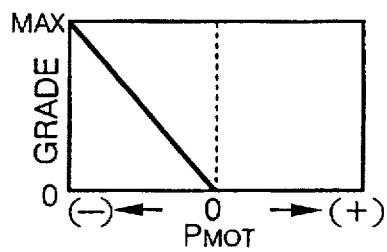
FIG.10 (c) (RULE NO.7)
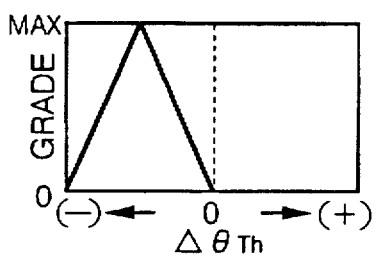
FIG.11 (a) (RULE NO.8)
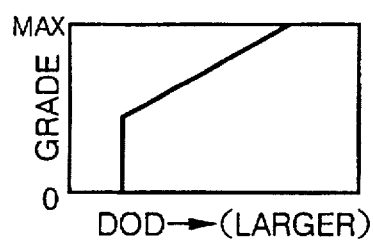
FIG.11 (b) (RULE NO.8)
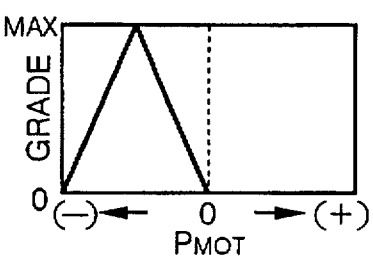
FIG.11 (c) (RULE NO.8)
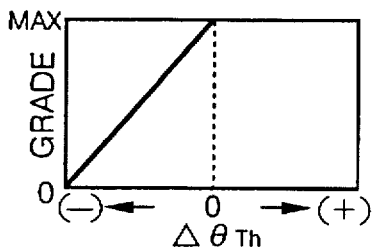
FIG.12 (a) (RULE NO.9)
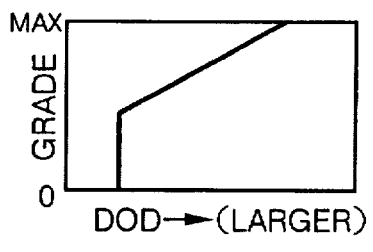
FIG.12 (b) (RULE NO.9)
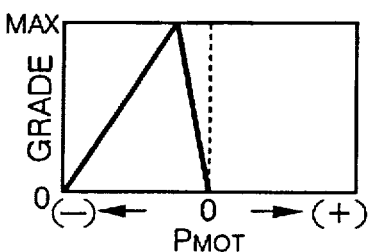
FIG.12 (c) (RULE NO.9)

(RULE NO.10)

(RULE NO.10)

(RULE NO.10)

(RULE NO.11)

(RULE NO.11)

(RULE NO.11)

(RULE NO.12)

(RULE NO.12)

(RULE NO.12)

(RULE NO.13)

(RULE NO.13)

(RULE NO.13)

(RULE NO.13)

(RULE NO.14)

(RULE NO.14)

(RULE NO.14)

(RULE NO.14)

FIG. 18 (a) (RULE NO.15)
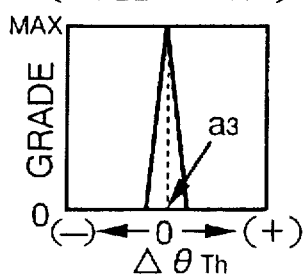
FIG. 18 (b) (RULE NO.15)
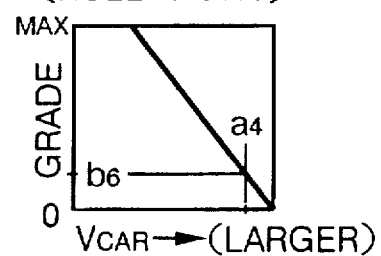
FIG. 18 (c) (RULE NO.15)
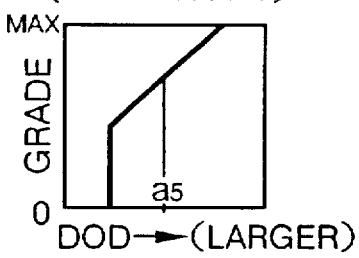
FIG. 18 (d) (RULE NO.15)
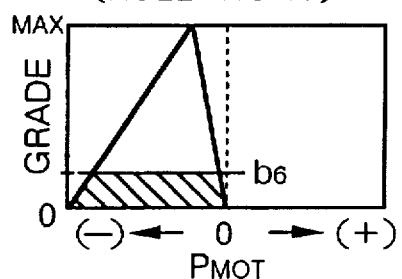
FIG. 19 (a) (RULE NO.16)
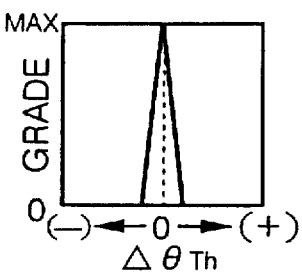
FIG. 19 (b) (RULE NO.16)
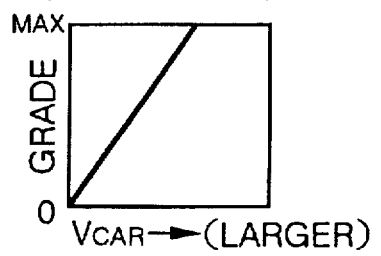
FIG. 19 (c) (RULE NO.16)
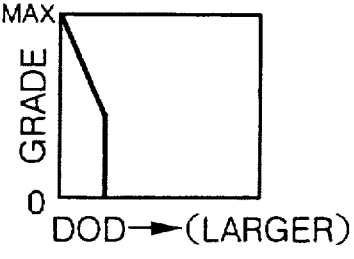
FIG. 19 (d) (RULE NO.16)
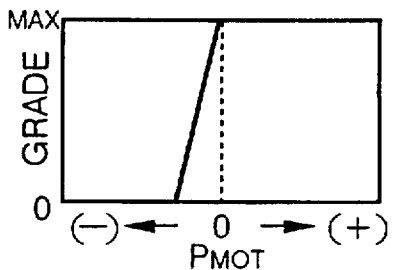

(RULE NO.17)

(RULE NO.17)

(RULE NO.17)

(RULE NO.17)

(RULE NO.18)

(RULE NO.18)

(RULE NO.18)

(RULE NO.18)

FIG. 24

| RULE NO. | PREMISE (IF)<br>(ROTATION FLUCTUATING STATE & STORED ENERGY<br>STATE WHEN ENGINE IS IDLING) | CONCLUSION (THEN)<br>(MOTOR OPERATING STATE) |
|---|---|---|
| 19 | $\Delta\theta_{Th} \approx 0$ & $V_{CAR}=0$ (IDLING STATE)<br>& $\Delta NE = \pm$SMALL~LARGE (ROTATION FLUCTUATION : SMALL~LARGE)<br>& DOD=LARGE (STORED ENERGY : SMALL) | $P_{MOT}= \mp$SMALL<br>(FLUCTUATION CORRECTION : SMALL) |
| 20 | $\Delta\theta_{Th} \approx 0$ & $V_{CAR}=0$ (IDLING STATE)<br>& $\Delta NE = \pm$SMALL (ROTATION FLUCTUATION : MEDIUM)<br>& DOD=MEDIUM (STORED ENERGY : MEDIUM) | $P_{MOT}= \mp$SMALL<br>(FLUCTUATION CORRECTION : SMALL) |
| 21 | $\Delta\theta_{Th} \approx 0$ & $V_{CAR}=0$ (IDLING STATE)<br>& $\Delta NE = \pm$MEDIUM (ROTATION FLUCTUATION : MEDIUM)<br>& DOD=MEDIUM (STORED ENERGY : MEDIUM) | $P_{MOT}= \mp$MEDIUM<br>(FLUCTUATION CORRECTION : MEDIUM) |
| 22 | $\Delta\theta_{Th} \approx 0$ & $V_{CAR}=0$ (IDLING STATE)<br>& $\Delta NE = \pm$LARGE (ROTATION FLUCTUATION : LARGE)<br>& DOD=MEDIUM (STORED ENERGY : MEDIUM) | $P_{MOT}= \mp$LARGE<br>(FLUCTUATION CORRECTION : LARGE) |
| 23 | $\Delta\theta_{Th} \approx 0$ & $V_{CAR}=0$ (IDLING STATE)<br>& $\Delta NE = \pm$SMALL (ROTATION FLUCTUATION : SMALL)<br>& DOD=SMALL (STORED ENERGY : LARGE) | $P_{MOT}= \mp$SMALL<br>(FLUCTUATION CORRECTION : SMALL) |
| 24 | $\Delta\theta_{Th} \approx 0$ & $V_{CAR}=0$ (IDLING STATE)<br>& $\Delta NE = \pm$MEDIUM (ROTATION FLUCTUATION : MEDIUM)<br>& DOD=SMALL (STORED ENERGY : LARGE) | $P_{MOT}= \mp$SMALL<br>(FLUCTUATION CORRECTION : SMALL) |

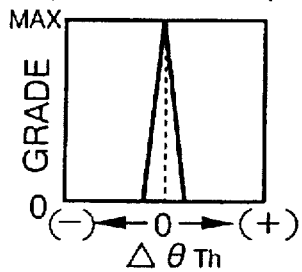
FIG. 25 (a) (RULE NO.19)
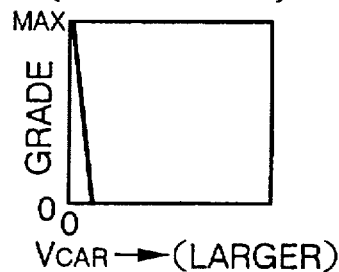
FIG. 25 (b) (RULE NO.19)
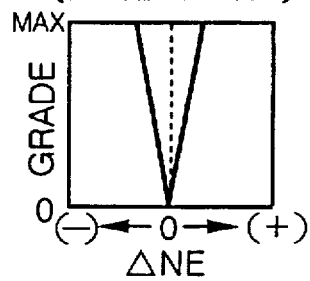
FIG. 25 (c) (RULE NO.19)
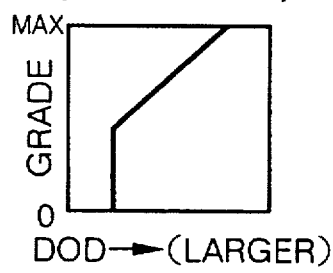
FIG. 25 (d) (RULE NO.19)
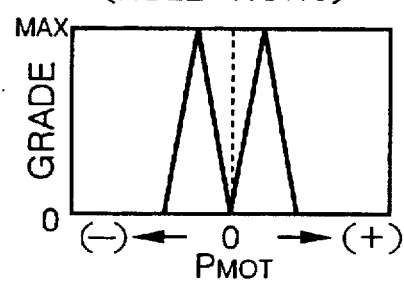
FIG. 25 (e) (RULE NO.19)
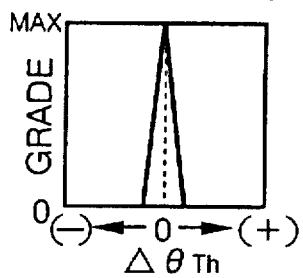
FIG. 26 (a) (RULE NO.20)
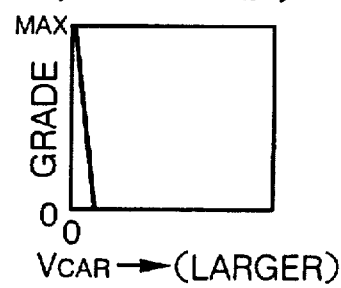
FIG. 26 (b) (RULE NO.20)
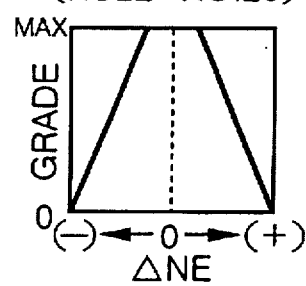
FIG. 26 (c) (RULE NO.20)
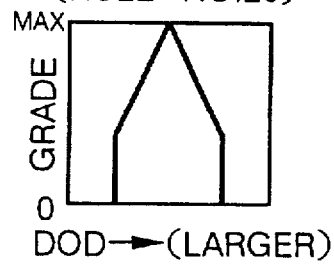
FIG. 26 (d) (RULE NO.20)
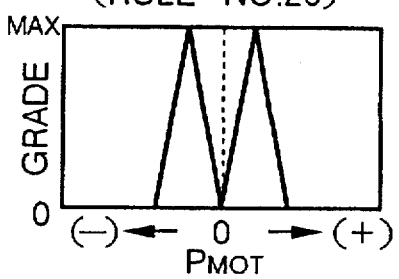
FIG. 26 (e) (RULE NO.20)

(RULE NO.21)

(RULE NO.21)

(RULE NO.21)

(RULE NO.21)

(RULE NO.21)

(RULE NO.22)

(RULE NO.22)

(RULE NO.22)

(RULE NO.22)

(RULE NO.22)

(RULE NO.23)

(RULE NO.23)

(RULE NO.23)

(RULE NO.23)

(RULE NO.23)

(RULE NO.24)

(RULE NO.24)

(RULE NO.24)

(RULE NO.24)

(RULE NO.24)

CONTROL SYSTEM FOR HYBRID VEHICLE

BACKGROUND OF THE INVENTION

1. Field of the Invention

The present invention relates to a control system for a hybrid vehicle having an engine for generating propulsive forces for the hybrid vehicle and an electric motor for generating assistive forces in addition to the propulsive forces generated by the engine and absorbing the propulsive forces generated by the engine.

2. Description of the Related Art

There has in recent years been developed a hybrid vehicle which has an engine, like an internal combustion engine for ordinary automobiles, as a power source for generating propulsive forces (running drive forces) for the hybrid vehicle and also an electric motor connected to the output shaft of the engine for generating assistive drive forces in addition to the propulsive forces generated by the engine, i.e., applying assistive drive forces to the output shaft of the engine, and for being operated as an electric generator by the engine (regenerative mode) to convert and absorb the propulsive forces generated by the engine as electric energy. To generate the assistive drive forces, the electric motor is energized by electric energy from an energy storage unit such as a storage battery. When it is operated as the electric generator, the generated electric energy is stored in the storage battery.

One such hybrid vehicle is disclosed in Japanese patent publication No. 6-1925, for example. In the disclosed hybrid vehicle, when the driver sets up a motor mode by operating a given switch, the electric motor is controlled to generate assistive drive forces depending on the depth to which the driver presses the accelerator pedal. When the driver sets up a regenerative mode by operating a given switch, the electric motor is controlled to generate electric energy for applying braking forces depending on the position of the switch, and part of the generated electric energy is stored in the storage battery.

Since the assistive drive forces produced by the electric motor are determined simply by the depth to which the driver presses the accelerator pedal, when the depth to which the driver presses the accelerator pedal is abruptly changed, the assistive drive forces produced by the electric motor are also abruptly changed. Therefore, the behavior of the hybrid vehicle as it runs tends to be sluggish. Furthermore, since a discharged current of the storage battery is also abruptly changed when the assistive drive forces produced by the electric motor are abruptly changed, the storage battery is apt to be short in service life.

In the motor mode, the electric motor does not generate electric energy. Therefore, the stored energy of the storage battery tends to be reduced, with the result that the storage battery will fail to supply enough energy to the electric motor, which will then fail to produce sufficient assistive drive forces. Inasmuch as the electric motor produces assistive drive forces only when the driver sets up the motor mode with the switch, if the driver forgets to operate the switch or keeps the regenerative mode turned on, then the electric motor cannot produce desired assistive drive forces.

In the regenerative mode, the braking forces produced by the generation of electric energy with the electric motor are determined by the position to which the switch is shifted by the driver. Therefore, if the driver does operate the switch properly, then the electric motor may produce smaller braking forces than would be necessary or larger braking forces than would be necessary.

Because the amount of generated electric energy which governs the braking forces is determined by the position to which the switch is shifted by the driver, the electric motor may possibly generate too a small amount of electric energy while the stored energy of the storage battery is small, and the stored energy of the storage battery may remain insufficient. Conversely, the electric motor may possibly generate too a large amount of electric energy while the stored energy of the storage battery is large, and the excessive electric energy may be wasted.

SUMMARY OF THE INVENTION

It is therefore an object of the present invention to provide a control system which is capable of accurately controlling an electric motor on a hybrid vehicle to generate assistive drive forces or electric energy in a manner to match an accelerated/decelerated state of the hybrid vehicle and a stored energy state of an energy storage unit, while allowing the behavior of the hybrid vehicle as it runs and the operating state of the electric motor to be varied smoothly.

To achieve the above object, there is provided in accordance with the present invention a control system in a hybrid vehicle having an engine for producing propulsive forces, an electric motor for selectively generating assistive drive forces in addition to the propulsive forces and electric energy converted from the propulsive forces, and an energy storage unit for selectively supplying electric energy to the electric motor and storing electric energy converted by the electric motor, comprising accelerated/decelerated state detecting means for detecting an accelerated/decelerated state of the hybrid vehicle, fuzzy inference memory means for storing a plurality of fuzzy rules and membership functions to determine an operating state of the electric motor from the accelerated/decelerated state according to a fuzzy inference process, goodness-of-fit calculating means for determining respective goodnesses of fit of the fuzzy rules based on the membership functions from the accelerated/decelerated state as detected by the accelerated/decelerated state detecting means, goodness-of-fit combining means for combining the goodnesses of fit as determined by the goodness-of-fit calculating means to determine an operating state of the motor, and motor control means for controlling the electric motor based on the operating state of the motor as determined by the goodness-of-fit combining means.

Based on the fuzzy rules and membership functions stored in the fuzzy inference memory means, the goodness-of-fit calculating means and the goodness-of-fit combining means determine an operating state of the motor, i.e., a state of the assistive drive forces or electric energy (regenerative electric energy) generated by the electric motor according to the fuzzy inference process from the accelerated/decelerated state as detected by the accelerated/decelerated state detecting means. Therefore, the operating state of the electric motor that is suitable for the accelerated/decelerated state of the hybrid vehicle is determined, taking into account the accelerated/decelerated state of the hybrid vehicle as expressed by the fuzzy rules. According to the determined operating state of the electric motor, the motor control means controls the electric motor based on the determined operating state of the electric motor. Consequently, the motor generates assistive drive forces or regenerative electric energy suitable for the accelerated/decelerated state of the hybrid vehicle, and the operating state of the electric motor is varied smoothly as the accelerated/decelerated state of the hybrid vehicle varies, making smooth the behavior of the hybrid vehicle as it runs.

Therefore, the motor generates assistive drive forces or regenerative electric energy depending on the accelerated/ decelerated state of the hybrid vehicle while at the same time the behavior of the hybrid vehicle as it runs and the operating state of the motor are varied smoothly.

Preferably, the accelerated/decelerated state detecting means comprises at least one of throttle-valve-opening detecting means for detecting an opening of a throttle valve of the engine, throttle-valve-opening rate-of-change detecting means for detecting a rate of change of the opening of the throttle valve, and vehicle speed detecting means for detecting a vehicle speed of the hybrid vehicle, whereby the accelerated/decelerated state can be detected by the one of the throttle-valve-opening detecting means, the throttle-valve-opening rate-of-change detecting means, and the vehicle speed detecting means.

Since the opening of the throttle valve, the rate of change thereof, and the vehicle speed which are detected explicitly represent whether the hybrid vehicle is to be accelerated or decelerated or is cruising, i.e., the accelerated/decelerated state from time to time, the accelerated/decelerated state of the hybrid vehicle from time to time can accurately be recognized on the basis of the detected values. Consequently, it is possible to achieve an operating state of the motor which matches the accelerated/decelerated state of the hybrid vehicle.

Preferably, the accelerated/decelerated state as detected by the accelerated/decelerated state detecting means includes acceleration and deceleration degrees demanded on the hybrid vehicle, and the fuzzy rules include fuzzy rules for increasing the assistive drive forces generated by the electric motor as the acceleration degree is larger, and fuzzy rules for increasing the electric energy generated by the electric motor as the deceleration degree is larger.

The electric motor can generate assistive drive forces depending on the acceleration degree demanded on the hybrid vehicle for providing propulsive forces suitable for the acceleration degree. The electric motor can also generate electric energy depending on the deceleration degree demanded on the hybrid vehicle for providing braking forces suitable for the deceleration degree.

Preferably, the accelerated/decelerated state as detected by the accelerated/decelerated state detecting means includes a vehicle speed of the hybrid vehicle when the hybrid vehicle is substantially cruising, and the fuzzy rules include fuzzy rules for increasing the electric energy generated by the electric motor as the vehicle speed is larger.

While the hybrid vehicle is cruising with no large propulsive forces required, only the engine produces required propulsive forces for the hybrid vehicle, and the electric motor generates electric energy (regenerative electric energy) to charge the energy storage unit. Since the electric energy generated by the electric motor is greater as the vehicle speed is higher and the output power of the engine is greater, the energy storage unit can be charged efficiently.

The control system further comprises stored energy detecting means for detecting an amount of stored energy of the energy storage unit, and the fuzzy rules and the membership functions stored in the fuzzy inference memory means include fuzzy rules and membership functions for determining the operating state of the electric motor corresponding to the detected amount of stored energy. The goodness-of-fit calculating means comprises means for determining the goodnesses of fit of the fuzzy rules based on the membership functions from the accelerated/decelerated state as detected by the accelerated/decelerated state detecting means and the amount of stored energy as detected by the stored energy detecting means.

Because the operating state of the motor is determined according to the fuzzy inference process based on not only the accelerated/decelerated state of the hybrid vehicle, but also the stored energy of the energy storage unit as detected by the stored energy detecting means, the electric motor generates assistive drive forces or an amount of electric energy (regenerative electric energy) matching not only the accelerated/decelerated state of the hybrid vehicle, but also the stored energy of the energy storage unit, and the operating state of the electric motor is varied smoothly. Thus, the stored energy of the energy storage unit is prevented from being abruptly changed. Therefore, the electric motor can accurately generate assistive drive forces or electric energy depending on not only the accelerated/decelerated state of the hybrid vehicle, but also the stored energy of the energy storage unit, while making smooth changes in the behavior of the hybrid vehicle as it runs, the operating state of the electric motor, and the stored energy of the energy storage unit.

Preferably, the fuzzy rules stored in the fuzzy inference memory means so as to correspond to the amount of stored energy of the energy storage unit include fuzzy rules for either reducing the assistive drive forces generated by the electric motor or increasing the electric energy generated by the electric motor as the amount of stored energy of the energy storage unit is smaller.

When the stored energy of the energy storage unit is small, the amount of electric energy supplied to the electric motor is reduced (may be reduced to "0") to prevent the stored energy of the energy storage unit from being further reduced at the time the electric motor generates assistive drive forces, and the electric energy generated by the motor is increased to quickly charge the energy storage unit at the time the electric motor generated electric energy. Conversely, when the stored energy of the energy storage unit is large, the amount of electric energy supplied to the electric motor is increased to increase assistive drive forces generated by the electric motor to provide sufficient propulsive forces for the hybrid vehicle at the time the electric motor generates assistive drive forces, and the amount of electric energy generated by the electric motor is reduced (may be reduced to "0") to prevent wasteful generation of electric energy at the time the electric motor generates electric energy.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3 is a diagram showing fuzzy rules used by the control system shown in FIG. 1;

FIG. 4(a) is a diagram showing a membership function corresponding to a fuzzy rule of rule number 1 shown in FIG. 3;

FIG. 4(b) is a diagram showing a membership function corresponding to the fuzzy rule of rule number 1 shown in FIG. 3;

FIG. 4(c) is a diagram showing a membership function corresponding to the fuzzy rule of rule number 1 shown in FIG. 3;

FIG. 5(a) is a diagram showing a membership function corresponding to a fuzzy rule of rule number 2 shown in FIG. 3;

FIG. 5(b) is a diagram showing a membership function corresponding to the fuzzy rule of rule number 2 shown in FIG. 3;

FIG. 5(c) is a diagram showing a membership function corresponding to the fuzzy rule of rule number 2 shown in FIG. 3;

FIG. 6(a) is a diagram showing a membership function corresponding to a fuzzy rule of rule number 3 shown in FIG. 3;

FIG. 6(b) is a diagram showing a membership function corresponding to the fuzzy rule of rule number 3 shown in FIG. 3;

FIG. 6(c) is a diagram showing a membership function corresponding to the fuzzy rule of rule number 3 shown in FIG. 3;

FIG. 7(a) is a diagram showing a membership function corresponding to a fuzzy rule of rule number 4 shown in FIG. 3;

FIG. 7(b) is a diagram showing a membership function corresponding to the fuzzy rule of rule number 4 shown in FIG. 3;

FIG. 7(c) is a diagram showing a membership function corresponding to the fuzzy rule of rule number 4 shown in FIG. 3;

FIG. 8(a) is a diagram showing a membership function corresponding to a fuzzy rule of rule number 5 shown in FIG. 3;

FIG. 8(b) is a diagram showing a membership function corresponding to the fuzzy rule of rule number 5 shown in FIG. 3;

FIG. 8(c) is a diagram showing a membership function corresponding to the fuzzy rule of rule number 5 shown in FIG. 3;

FIG. 9(a) is a diagram showing a membership function corresponding to a fuzzy rule of rule number 6 shown in FIG. 3;

FIG. 9(b) is a diagram showing a membership function corresponding to the fuzzy rule of rule number 6 shown in FIG. 3;

FIG. 9(c) is a diagram showing a membership function corresponding to the fuzzy rule of rule number 6 shown in FIG. 3;

FIG. 10(a) is a diagram showing a membership function corresponding to a fuzzy rule of rule number 7 shown in FIG. 3;

FIG. 10(b) is a diagram showing a membership function corresponding to the fuzzy rule of rule number 7 shown in FIG. 3;

FIG. 10(c) is a diagram showing a membership function corresponding to the fuzzy rule of rule number 7 shown in FIG. 3;

FIG. 11(a) is a diagram showing a membership function corresponding to a fuzzy rule of rule number 8 shown in FIG. 3;

FIG. 11(b) is a diagram showing a membership function corresponding to the fuzzy rule of rule number 8 shown in FIG. 3;

FIG. 11(c) is a diagram showing a membership function corresponding to the fuzzy rule of rule number 8 shown in FIG. 3;

FIG. 12(a) is a diagram showing a membership function corresponding to a fuzzy rule of rule number 9 shown in FIG. 3;

FIG. 12(b) is a diagram showing a membership function corresponding to the fuzzy rule of rule number 9 shown in FIG. 3;

FIG. 12(c) is a diagram showing a membership function corresponding to the fuzzy rule of rule number 9 shown in FIG. 3;

FIG. 18(a) is a diagram showing a membership function corresponding to a fuzzy rule of rule number 15 shown in FIG. 3;

FIG. 18(b) is a diagram showing a membership function corresponding to the fuzzy rule of rule number 15 shown in FIG. 3;

FIG. 18(c) is a diagram showing a membership function corresponding to the fuzzy rule of rule number 15 shown in FIG. 3;

FIG. 18(d) is a diagram showing a membership function corresponding to the fuzzy rule of rule number 15 shown in FIG. 3;

FIG. 19(a) is a diagram showing a membership function corresponding to a fuzzy rule of rule number 16 shown in FIG. 3;

FIG. 19(b) is a diagram showing a membership function corresponding to the fuzzy rule of rule number 16 shown in FIG. 3;

FIG. 19(c) is a diagram showing a membership function corresponding to the fuzzy rule of rule number 16 shown in FIG. 3;

FIG. 19(d) is a diagram showing a membership function corresponding to the fuzzy rule of rule number 16 shown in FIG. 3;

FIG. 24 is a diagram showing fuzzy rules used by the control system shown in FIG. 1;

FIG. 25(a) is a diagram showing a membership function corresponding to a fuzzy rule of rule number 19 shown in FIG. 24;

FIG. 25(b) is a diagram showing a membership function corresponding to the fuzzy rule of rule number 19 shown in FIG. 24;

FIG. 25(c) is a diagram showing a membership function corresponding to the fuzzy rule of rule number 19 shown in FIG. 24;

FIG. 25(d) is a diagram showing a membership function corresponding to the fuzzy rule of rule number 19 shown in FIG. 24;

FIG. 25(e) is a diagram showing a membership function corresponding to the fuzzy rule of rule number 19 shown in FIG. 24;

FIG. 26(a) is a diagram showing a membership function corresponding to a fuzzy rule of rule number 20 shown in FIG. 24;

FIG. 26(b) is a diagram showing a membership function corresponding to the fuzzy rule of rule number 20 shown in FIG. 24;

FIG. 26(c) is a diagram showing a membership function corresponding to the fuzzy rule of rule number 20 shown in FIG. 24;

FIG. 26(d) is a diagram showing a membership function corresponding to the fuzzy rule of rule number 20 shown in FIG. 24;

FIG. 26(e) is a diagram showing a membership function corresponding to the fuzzy rule of rule number 20 shown in FIG. 24;

DETAILED DESCRIPTION OF THE PREFERRED EMBODIMENT

Figure 1:
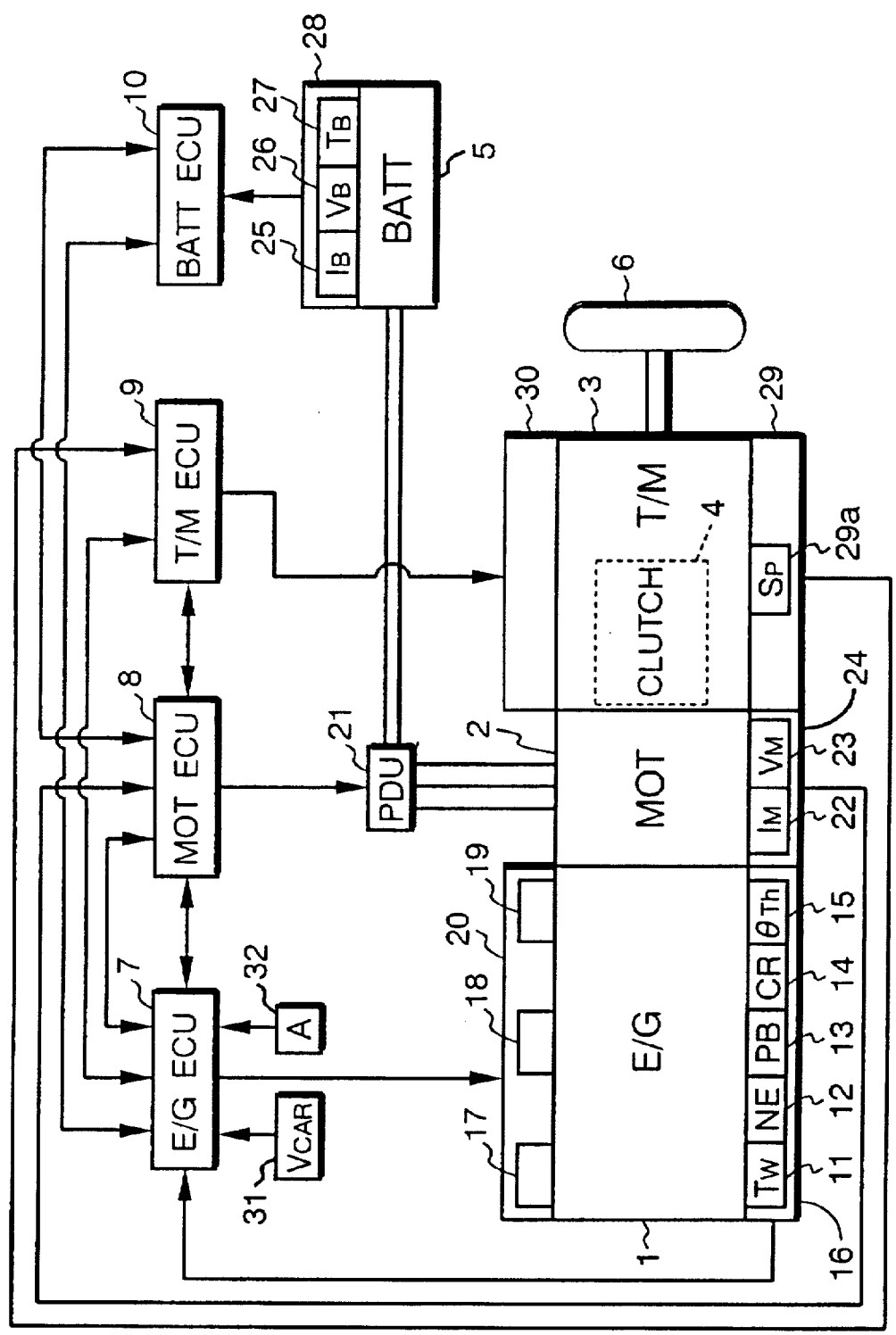
FIG. 1 is a block diagram of a hybrid vehicle system which incorporates a control system therefor according to the present invention.

As shown in FIG. 1, a hybrid vehicle system which incorporates a control system therefor according to the present invention has an engine 1, an electric motor 2, a transmission 3 including a clutch 4, a storage battery 5 as an energy storage unit, a drive wheel 6, an engine controller 7, a motor controller 8, a transmission controller 9, and a battery controller 10.

The engine 1 which generates propulsive forces for the hybrid vehicle has an output shaft (crankshaft) operatively connected through the electric motor 2 and the transmission 3 to the drive wheel 6. The engine 1 transmits generated propulsive forces through the electric motor 2 and the transmission 3 to the drive wheel 6 to propel the hybrid vehicle.

The engine 1 is associated with an engine state quantity detecting device 16 including sensors 11~15 for supplying signals representing an engine temperature Tw, a rotational speed NE, an intake pressure PB, a crankshaft angle CR, and a throttle valve opening θth of the engine 1, respectively, to the engine controller 7. The engine 1 is also associated with an engine drive mechanism 20 which includes an ignition unit 17 for igniting an air/fuel mixture supplied to the engine 1, a fuel supply unit 18 for supplying fuel to the engine 1, and a throttle actuator 19 for actuating a throttle valve of the engine 1.

The electric motor 2 is operable selectively as a motor (motor mode) energized by the storage battery 5 for generating rotational drive forces and a generator (regenerative mode) operated by the engine 1 or the wheel 6 during regenerative braking for generating electric energy. The electric motor 2 supplies electric energy to and receives electric energy from the storage battery 5 through a motor energization control circuit (hereinafter referred to as a "PDU") 21 which comprises an inverter circuit, etc. When the electric motor 2 is operated in the motor mode, it generates rotational drive forces in the same direction as propulsive drive forces of the output shaft of the engine 1, and the generated rotational drive forces are transmitted as assistive drive forces together with the propulsive drive forces generated by the engine 1 to the drive wheel 6. When the hybrid vehicle is decelerated, the electric motor 2 is operated in the regenerative mode and converts part of the decelerating energy into electric energy. When the hybrid vehicle is cruising, the electric motor 2 is also operated in the regenerative mode and converts the propulsive drive forces generated by the engine 1 into electric energy. The generated electric energy is supplied from the electric motor 2 through the PDU 21 to the storage battery 5.

The electric motor 2 is associated with a motor state quantity detecting device 24 including sensors 22, 23 for supplying signals representing a current IM and a voltage VM, respectively, of the electric motor 2 to the motor controller 8.

The storage battery 5 is associated with a battery state quantity detecting device 28 including sensors 25~27 for supplying signals representing a charging/discharging current IB, a voltage VB, and a temperature TB, respectively, thereof to the battery controller 10.

The transmission 3 is operated by the clutch 4 to disconnect the drive wheel 6 from the engine 1 and the motor 2 or transmit drive forces, at a selected gear ratio, from the engine 1 and the motor 2 to the drive wheel 6. The transmission 3 is associated with a transmission state quantity detecting device 29 including a sensor 29a for supplying a signal representing a shifted position SP of a gearshift lever (not shown) which controls the gear ratio of the transmission 3, to the transmission controller 9. The transmission 3 is also associated with an actuator 30 for actuating the transmission 3 to select a gear ratio and also for engaging and disengaging the clutch 4.

The controllers 7~10 comprise respective microcomputers and are connected to each other by bus lines or the like so that they can exchange data.

The engine controller 7, which serves to control operation of the engine 1, is supplied with detected signals from the sensors 11~15 associated with the engine 1 and is also supplied with a signal from a sensor 31 which detects a vehicle speed VCAR of the hybrid vehicle and a signal from a sensor 32 which detects a depressed amount A of an accelerator pedal (not shown). Based on signals from these sensors 11~15, 31, 32, the engine controller 7 determines an operating state of the engine 1, and indicates the determined operating state to the ignition unit 17, the fuel supply unit 18, and the throttle actuator 19 to enable the engine drive mechanism 20 to control the operation of the engine 1.

Figure 2:
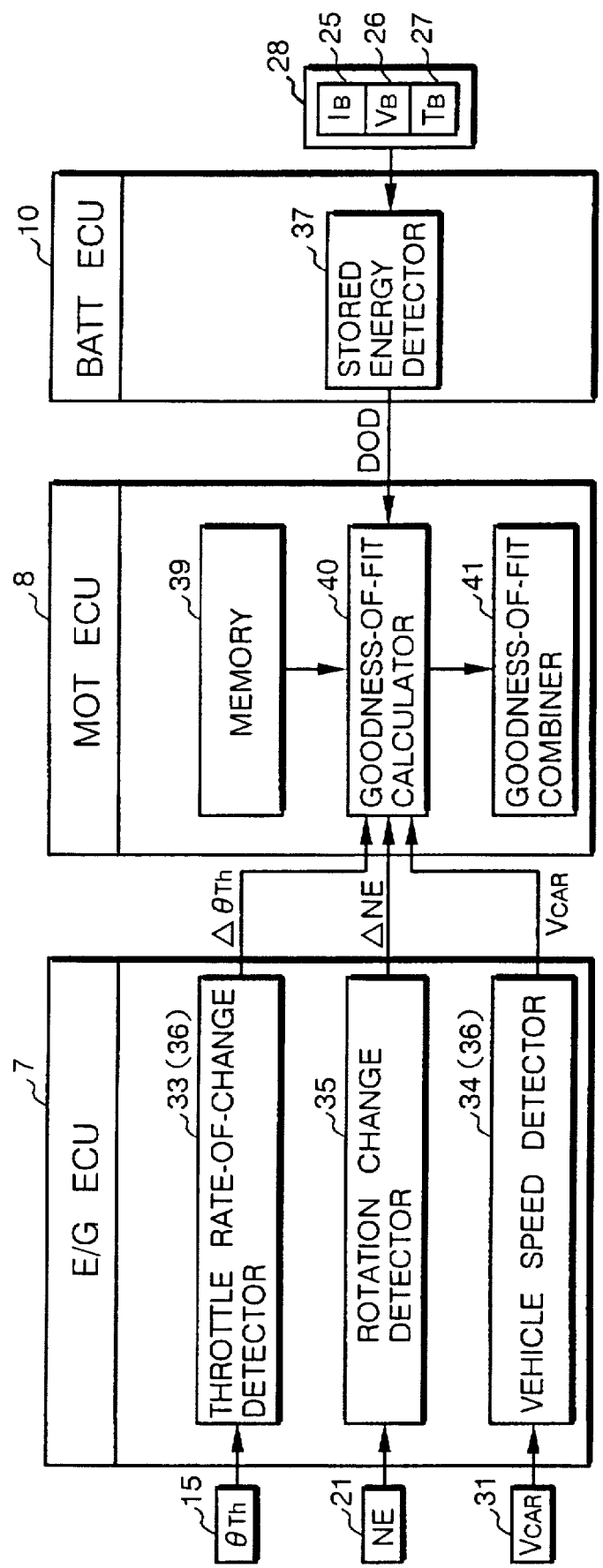
FIG. 2 is a detailed block diagram of a portion of the control system shown in FIG. 1.
Figure 13:
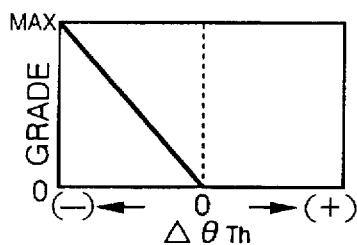
FIG. 13(a) is a diagram showing a membership function corresponding to a fuzzy rule of rule number 10 shown in FIG. 3.
FIG. 13(b) is a diagram showing a membership function corresponding to the fuzzy rule of rule number 10 shown in FIG. 3.
FIG. 13(c) is a diagram showing a membership function corresponding to the fuzzy rule of rule number 10 shown in FIG. 3.
Figure 13:
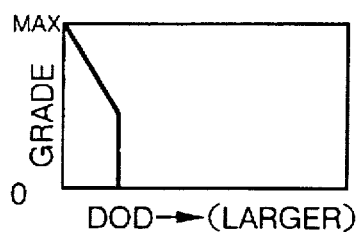
Figure 13:
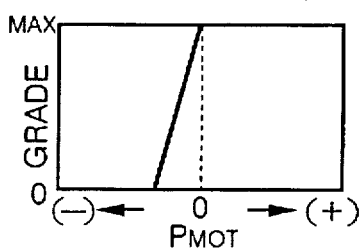
Figure 14:
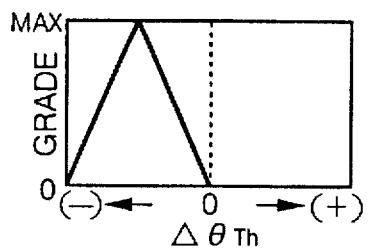
FIG. 14(a) is a diagram showing a membership function corresponding to a fuzzy rule of rule number 11 shown in FIG. 3.
FIG. 14(b) is a diagram showing a membership function corresponding to the fuzzy rule of rule number 11 shown in FIG. 3.
FIG. 14(c) is a diagram showing a membership function corresponding to the fuzzy rule of rule number 11 shown in FIG. 3.
Figure 14:
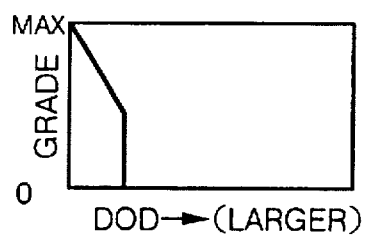
Figure 14:
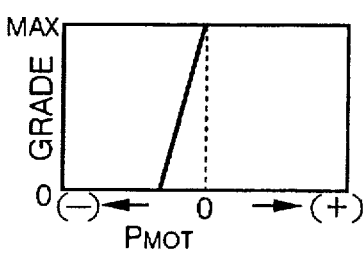
Figure 15:
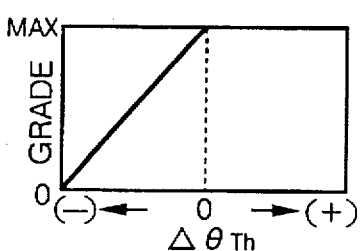
FIG. 15(a) is a diagram showing a membership function corresponding to a fuzzy rule of rule number 12 shown in FIG. 3.
FIG. 15(b) is a diagram showing a membership function corresponding to the fuzzy rule of rule number 12 shown in FIG. 3.
FIG. 15(c) is a diagram showing a membership function corresponding to the fuzzy rule of rule number 12 shown in FIG. 3.
Figure 15:
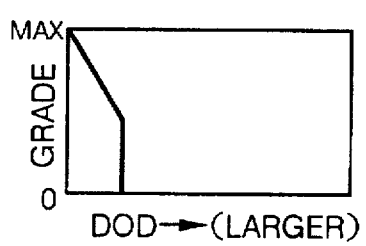
Figure 15:
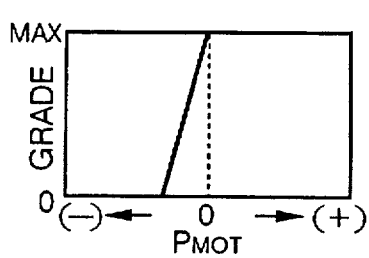

As shown in FIG. 2, the engine controller 7 has a throttle rate-of-change detector 33 (throttle valve opening rate-of-change detecting means) for detecting a rate of change Δθth (hereafter referred to as a "throttle rate-of-change") of the opening of the throttle valve of the engine 1 based on a signal from the sensor 15, a vehicle speed detector 34 (vehicle speed detecting means) for detecting a vehicle speed VCAR based on a signal from the sensor 31, and a rotation change detector 35 for detecting a rotational speed change ΔNE of the engine 1 with respect to a predetermined rotational speed of the engine 1 while the engine 1 is idling, based on a signal from the sensor 21. The engine controller 7 supplies detected values as indicating an accelerated or decelerated state of the hybrid vehicle and an idling state of the engine 1 to the motor controller 8. The throttle rate-of-change detector 33 detects a rate of change of the opening of the throttle valve per unit time as a rate of change ΔΘth. The rotation change detector 35 detects the difference between an actual rotational speed of the engine 1 and a predetermined rotational speed (e.g., 750 rpm) of the engine 1 while the engine 1 is idling, as a rotational speed change ΔNE.

The throttle rate-of-change detector 33 and the vehicle speed detector 34 jointly serve as an accelerated/decelerated state detecting means 36 for detecting an accelerated/decelerated state of the hybrid vehicle. Specifically, the magnitude of the rate of change ΔΘth which has a positive value (indicative of an increase in the throttle valve opening Θth) detected by the throttle rate-of-change detector 33 represents a demand for acceleration of the hybrid vehicle, and the magnitude of the rate of change ΔΘth which has a negative value (indicative of a decrease in the throttle valve opening Θth) detected by the throttle rate-of-change detector 33 represents a demand for deceleration of the hybrid vehicle. The vehicle speed VCAR that is detected by the vehicle speed detector 34 when the rate of change ΔΘth is sufficiently small (ΔΘth≈0) represents a vehicle speed (cruising speed) when the hybrid vehicle is cruising (acceleration/deceleration≈0).

When the rate of change ΔΘth detected by the throttle rate-of-change detector 33 and the vehicle speed VCAR detected by the vehicle speed detector 34 are substantially nil ("0"), they jointly indicate an idling state of the engine 1.

The battery controller 10, which serves to monitor the state of the battery 5, is supplied with detected signals from the sensors 25~27 associated with the storage battery 5. As shown in FIG. 2, the battery controller 10 has a stored energy detector 37 (stored energy detecting means) for detecting a stored amount of energy of the storage battery 5 based on a charging/discharging current IB, a voltage VB, and a temperature TB of the storage battery 5 which are indicated by detected signals from the sensors 25~27. The stored energy detector 37 detects a depth-of-discharge (DOD) of the storage battery 5 (a discharged amount of energy with respect to a fully charged state of the storage battery 5) as indicating the stored amount of energy of the storage battery 5. Basically, the stored energy detector 37 integrates the product of the charging/discharging current IB and the voltage VB from time to time which are indicated by the detected signals from the sensors 25, 26, i.e., electric power, of the storage battery 5, and corrects the integrated value with the temperature TB of the storage battery 5 which is indicated by the detected signal from the sensor 27 thereby to determine a charged/discharged amount of electric energy with respect to the fully charged state of the storage battery 5, thus detecting a depth-of-discharge DOD, from time to time, of the storage battery 5. The depth-of-discharge DOD is 0% when the storage battery 5 is fully charged and 100% when the storage battery 5 is fully discharged. The depth-of-discharge DOD increases from 0% to 100% as the stored energy (remaining capacity) of the storage battery 5 decreases from the fully charged state. The battery controller 10 supplies the depth-of-discharge DOD detected by the stored energy detector 37 to the motor controller 8, and displays the depth-of-discharge DOD on a display unit (not shown) in the hybrid vehicle.

The motor controller 8 serves as a motor control means for controlling operation of the electric motor 2 through the PDU 21. The motor controller 8 is supplied with signals from the sensors 22, 23 associated with the electric motor 2, detected values of the rate of change ΔΘth, the vehicle speed VCAR, and the rotational speed change ΔNE of the engine 1 from the engine controller 7, and a detected value of the depth-of-discharge DOD of the storage battery 5 from the battery controller 10. The motor controller 8 comprises a memory 39 (fuzzy inference memory means) which stores beforehand membership functions and fuzzy rules for carrying out a fuzzy control process (described later on), and a goodness-of-fit calculator 40 (goodness-of-fit calculating means) and a goodness-of-fit combiner 41 (goodness-of-fit combining means) for carrying out predetermined calculations using the membership functions and the fuzzy rules. Based on the rate of change ΔΘth, the vehicle speed VCAR, the rotational speed change ΔNE, the depth-of-discharge DOD which are supplied from the engine controller 7 and the battery controller 10, and the membership functions and the fuzzy rules which are stored in the memory 39, the goodness-of-fit calculator 40 and the goodness-of-fit combiner 41 determine an accelerated/decelerated stage of the hybrid vehicle and an operating state of the electric motor 2 while the engine 1 is idling, according to a fuzzy inference process. The motor controller 8 controls the electric motor 2 through the PDU 21 based on the determined states. Details of operation of the motor controller 8 will be described later on.

The transmission controller 9 is supplied with a detected signal from the sensor 29a associated with the transmission 3, and controls the actuator 30 to select a gear ratio of the transmission 3 and engages and disengages the clutch 4 based on a shifted position SP represented by the supplied signal.

Operation of the hybrid vehicle will be described below.

First, operation of the hybrid vehicle while it is running will be described below.

When the driver of the hybrid vehicle depresses the accelerator pedal with the engine 1 started, the engine 1 transmits drive forces to the drive wheel 6, propelling the hybrid vehicle. The rate of change ΔΘth and the vehicle speed VCAR from time to time detected by the throttle rate-of-change detector 33 and the vehicle speed detector 34 are supplied as data indicative of an accelerated/decelerated state of the hybrid vehicle to the motor controller 8. Data of the depth-of-discharge DOD from time to time detected by the stored energy detector 37 is also supplied to the motor controller 8.

The motor controller 8 controls the electric motor 2 in a manner described below. Prior to describing the controlling operation of the motor controller 8, the fuzzy rules and the membership functions stored in the memory 39 will first be described below.

The memory 39 of the motor controller 8 stores a plurality of fuzzy rules shown in FIG. 3 and a plurality of membership functions shown in FIGS. 4(a), 4(b), 4(c) through FIGS. 21(a), 21(b), 21(c), 21(d) which correspond to the fuzzy rules.

The fuzzy rules shown in FIG. 3 prescribe operating states of the electric motor 3 with respect to various accelerated/decelerated states of the hybrid vehicle and stored energy states of the storage battery 5, the accelerated/decelerated states and the stored energy states being defined as premises and the operating states of the electric motor 3 as conclusions.

According to the fuzzy rules, an accelerated/decelerated state of the hybrid vehicle indicates acceleration and deceleration degrees demanded on the hybrid vehicle and a vehicle speed (cruising speed) at the time when the hybrid vehicle is cruising. The demanded acceleration and deceleration degrees are represented respectively by the magnitude of the rate of change ΔΘth which has a positive value (indicative of an increase in the throttle valve opening Θth) and the magnitude of the rate of change ΔΘth which has a negative value (indicative of a decrease in the throttle valve opening Θth). The cruising speed at the time when the hybrid vehicle is cruising is represented by a vehicle speed VCAR at the time when the rate of change ΔΘth is substantially nil ("0"). A stored energy state of the storage battery 5 is represented by the magnitude of the depth-of-discharge DOD (The stored energy state of the storage battery 5 is smaller as the depth-of-discharge DOD is larger). An operating state of the electric motor 2 that is prescribed by an accelerated/decelerated state of the hybrid vehicle and a stored energy state is represented by the magnitude of an output power PMOT of the electric motor 2 which is positive when the electric motor 2 operates in the motor mode to produce assistive drive forces for the engine 1 and negative when the electric motor 2 operates in the regenerative mode to generate electric energy. For example, the fuzzy rule of rule number 1 shown in FIG. 3 shows that when the rate of change ΔΘth has a large positive value indicative of a large acceleration degree demanded on the hybrid vehicle and the depth-of-discharge DOD is not substantially large indicating that the stored energy of the storage battery 5 is not substantially small, the output power PMOT of the electric motor 2 will be of a large positive value, controlling the electric motor 2 to produce assistive drive forces.

According to the fuzzy rules, as the rate of change ΔΘth has a larger positive value, i.e., the acceleration degree demanded on the hybrid vehicle is greater, as indicated by the fuzzy rules of rule numbers 1–3, the output power PMOT of the electric motor 2 as assistive drive forces is increased, and as the rate of change ΔΘth has a larger negative value, i.e., the deceleration degree demanded on the hybrid vehicle is greater, as indicated by the fuzzy rules of rule numbers 7–9, the output power PMOT of the electric motor 2 as regenerated electric energy is increased. As the depth-of-discharge DOD of the storage battery 5 is large (the stored energy of the storage battery 5 is small) when the rate of change ΔΘth has a positive value, i.e., when the hybrid vehicle is accelerated, as indicated by the fuzzy rules of rule numbers 4–6, the output power PMOT of the electric motor 2 as assistive drive forces is set to "0". As the depth-of-discharge DOD of the storage battery 5 is small (the stored energy of the storage battery 5 is large) when the rate of change ΔΘth has a negative value, i.e., when the hybrid vehicle is decelerated, as indicated by the fuzzy rules of rule numbers 10–12, the output power PMOT of the electric motor 2 as regenerated electric energy is set to "0". When the hybrid vehicle is cruising (ΔΘth≈0), as indicated by the fuzzy rules of rule numbers 13–15, the electric motor 2 is operated in the regenerative mode and the output power PMOT of the electric motor 2 as regenerated electric energy is made greater as the cruising speed VCAR is higher. When the depth-of-discharge DOD is small, i.e., when the storage battery 5 is substantially fully charged, while the hybrid vehicle is cruising, as indicated by the fuzzy rules of rule numbers 16–18, the output power PMOT of the electric motor 2 as regenerated electric energy is set to "0" and the electric motor 2 is not operated in the regenerative mode.

The membership functions shown in FIGS. 4(a), 4(b), 4(c)–21(a), 21(b), 21(c) are established so as to correspond to the fuzzy rules shown in FIG. 3. The membership functions define the relationship between values of the rate of change ΔΘth, the vehicle speed VCAR, the depth-of-discharge DOD, and the output power PMOT in the fuzzy rules and grades thereof (goodness of fit). Specifically, the membership functions corresponding to the fuzzy rules express the magnitudes of the rate of change ΔΘth, the vehicle speed VCAR (fuzzy rules 13–18 only), the depth-of-discharge DOD, and the output power PMOT in the fuzzy rules in terms of grades thereof depending on their values.

For example, as shown in FIGS. 4(a) through 4(c), the membership functions corresponding to the fuzzy rule of rule number 1 are established respectively with respect to the rate of change ΔΘth, the depth-of-discharge DOD, and the output power PMOT used in this fuzzy rule. According to the fuzzy rule of rule number 1, as described above, when the rate of change ΔΘth has a large positive value indicative of a large acceleration degree demanded on the hybrid vehicle and the depth-of-discharge DOD is not substantially large indicating that the stored energy of the storage battery 5 is not substantially small, the output power PMOT of the electric motor 2 will be of a large positive value, controlling the electric motor 2 to produce large assistive drive forces. Therefore, the membership function shown in FIG. 4(a) with respect to the rate of change ΔΘth has grades greater as the rate of change ΔΘth is greater, and the membership function shown in FIG. 4(b) with respect to the depth-of-discharge DOD has grades greater as the depth-of-discharge DOD is smaller. The membership function shown in FIG. 4(c) with respect to the output power PMOT has grades greater as the output power PMOT (positive) is greater.

The memory 39 also stores fuzzy rules and membership functions for prescribing operation of the electric motor 2 when the engine 1 is idling. These fuzzy rules and membership functions will be described later on.

Using the above fuzzy rules and membership functions, the motor controller 8 determines the output power PMOT of the electric motor 2 according to a fuzzy inference process from actually detected values of the rate of change ΔΘth, the vehicle speed VCAR, and the depth-of-discharge DOD that are supplied from the engine controller 7 and the battery controller 10. In the illustrated embodiment, the motor controller 8 employs an MIN-product sum process as the fuzzy inference process.

In the motor controller 8, the goodness-of-fit calculator 40 determines grades (goodness of fit) of detected values of the rate of change ΔΘth, the vehicle speed VCAR, and the depth-of-discharge DOD (also referred to as rule parameters) based on the membership functions corresponding to each of the fuzzy rules. The motor controller 8 then determines a minimum one of the determined grades as a general goodness of fit of the detected values of the rule parameters in the fuzzy rule. Specifically, as shown in FIGS. 4(a), 4(b), 4(c) through 6(a), 6(b), 6(c), when detected values of the rate of change ΔΘth and the depth-of-discharge DOD are ΔΘth=a1 (>>0) and DOD=a2 (≈0), indicating that the demanded acceleration degree is large and the depth-of-discharge DOD is sufficiently small, grades b1, b2, b3 with respect to the detected value a1 of the rate of change ΔΘth for the fuzzy rules of rule numbers 1–3 are smaller than a grade (=MAX) with respect to the detected value a2 of the depth-of-discharge DOD. In this case, the general goodnesses of fit with respect to the fuzzy rules of rule numbers 1–3 are indicated by b1, b2, b3, respectively. For the fuzzy rules of rule numbers 4–18, as is apparent from FIGS. 7(a), 7(b), 7(c) through 21(a), 21(b), 21(c), a grade with respect to either one of the detected value a1 of the rate of change ΔΘth and the detected value a2 of the depth-of-discharge DOD is "0", and hence the general goodnesses of fit with respect to these fuzzy rules are all "0".

Similarly, as shown in FIGS. 16(a), 16(b), 16(c), 16(d) through 18(a), 18(b), 18(c), 18(d), when detected values of the rate of change ΔΘth, the vehicle speed VCAR, and the depth-of-discharge DOD are ΔΘth=a3=0, VCAR=a4, DOD=a5, indicating that the hybrid vehicle is cruising at a relatively high speed and the depth-of-discharge DOD is medium, the general goodnesses of fit with respect to the fuzzy rules of rule numbers 13~15 are b4, b5, b6, respectively. For the fuzzy rules of rule numbers 1~12, 16~18, as is apparent from FIGS. 4(a), 4(b), 4(c) through 15(a), 15(b), 15(c) and FIGS. 19(a), 19(b), 19(c), 19(d) through 21(a), 21(b), 21(c), 21(d), a grade with respect to either one of the detected value a3 (=0) of the rate of change ΔΘth (in FIG. 6(a) when ΔΘth≦0 and in FIG. 15(a) when ΔΘth≧0, see FIG. 3, Rules 3 and 12, respectively) and the detected value a5 of the depth-of-discharge DOD is "0", and hence the general goodnesses of fit with respect to these fuzzy rules are all "0".

After the goodness-of-fit calculator 40 has determined general goodnesses of fit of detected values of the rule parameters for the fuzzy rules, the goodness-of-fit combiner 41 extracts portions of the membership functions of the output power PMOT below the general goodnesses of fit from the general goodnesses of fit for the respective fuzzy rules and the membership functions of the output power PMOT, and combines the extracted portions with respect to all the fuzzy rules. The goodness-of-fit combiner 41 then determines the center of gravity of the combined data (center of gravity method), and determines a value of the output power PMOT at the determined center of gravity as an output power to be produced by the electric motor 2.

Figure 22:
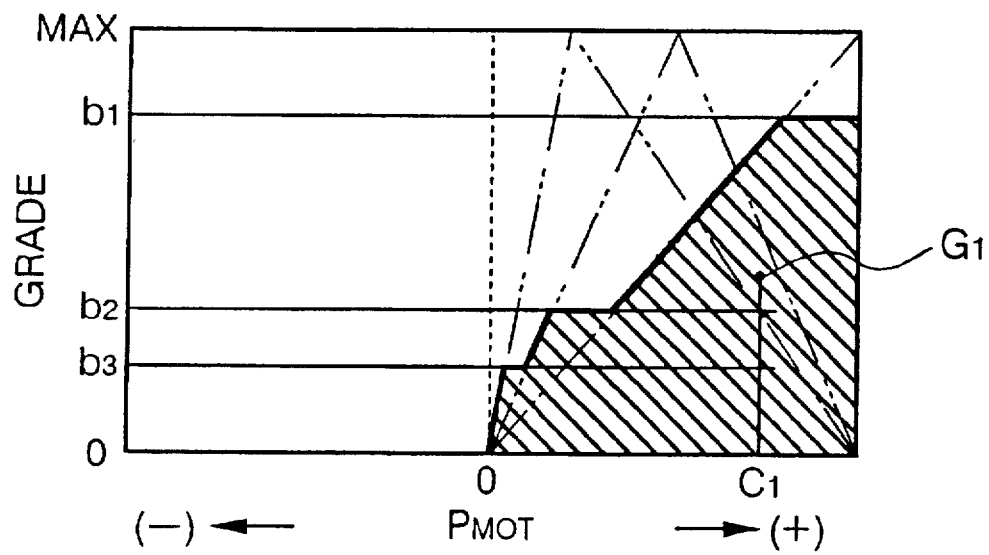
FIG. 22 is a diagram illustrative of an operation of the control system shown in FIG. 1.

Specifically, as shown in FIGS. 4(a), 4(b), 4(c) through 6(a), 6(b), 6(c), when detected values of the rate of change ΔΘth and the depth-of-discharge DOD are ΔΘth=a1 and DOD=a2, since the general goodnesses of fit with respect to the fuzzy rules of rule numbers 1~3 are indicated by b1, b2, b3, respectively, portions of the membership functions of the output power PMOT according to these fuzzy rules below the general goodnesses b1, b2, b3 of fit are shown hatched in FIGS. 4(c), 5(c), 6(c), and these hatched portions are extracted. For the other fuzzy rules, no portions of the membership functions are extracted because the general goodnesses of fit are "0". The goodness-of-fit combiner 41 then overlaps the extracted portions, producing a combined function shown in FIG. 22, determines a center of gravity G1 of the combined function, and determines a value c1 (>0) of the output power PMOT corresponding to the center of gravity G1 as an output power to be produced by the electric motor 2. The output power PMOT=c1 thus determined fits in the fuzzy rules of rule numbers 1~3 at degrees of the general goodnesses of fit. Since the general goodness of fit corresponding to the fuzzy rule of rule number 1 is highest, the determined output power PMOT=c1 is relatively large for the electric motor 2 to generate assistive drive forces.

Figure 16:
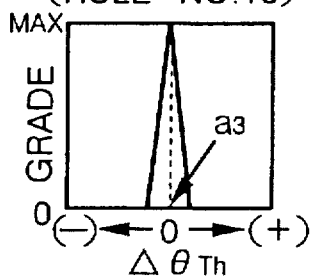
FIG. 16(a) is a diagram showing a membership function corresponding to a fuzzy rule of rule number 13 shown in FIG. 3.
FIG. 16(b) is a diagram showing a membership function corresponding to the fuzzy rule of rule number 13 shown in FIG. 3.
FIG. 16(c) is a diagram showing a membership function corresponding to the fuzzy rule of rule number 13 shown in FIG. 3.
FIG. 16(d) is a diagram showing a membership function corresponding to the fuzzy rule of rule number 13 shown in FIG. 3.
Figure 16:
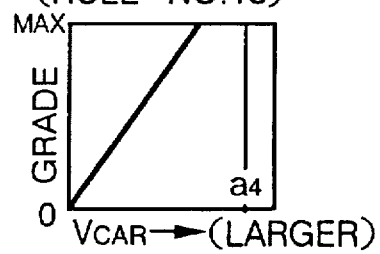
Figure 16:
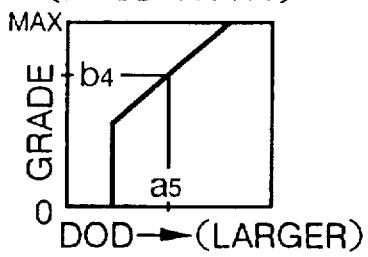
Figure 16:
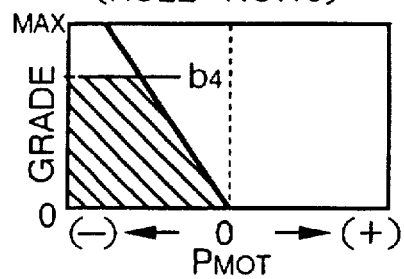
Figure 17:
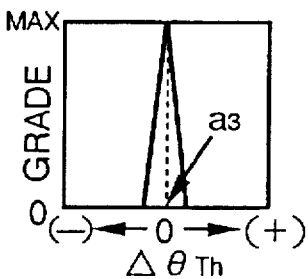
FIG. 17(a) is a diagram showing a membership function corresponding to a fuzzy rule of rule number 14 shown in FIG. 3.
FIG. 17(b) is a diagram showing a membership function corresponding to the fuzzy rule of rule number 14 shown in FIG. 3.
FIG. 17(c) is a diagram showing a membership function corresponding to the fuzzy rule of rule number 14 shown in FIG. 3.
FIG. 17(d) is a diagram showing a membership function corresponding to the fuzzy rule of rule number 14 shown in FIG. 3.
Figure 17:
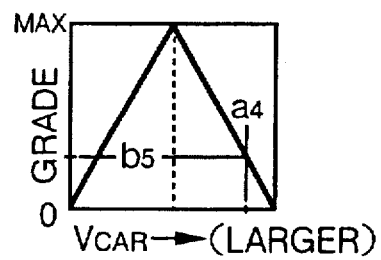
Figure 17:
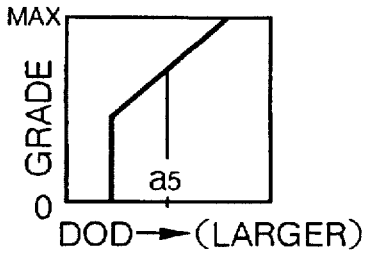
Figure 17:
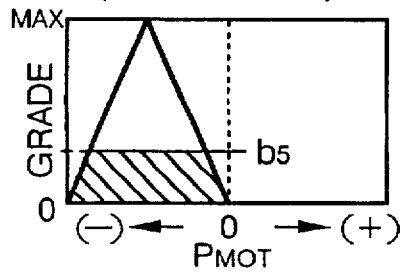
Figure 20:
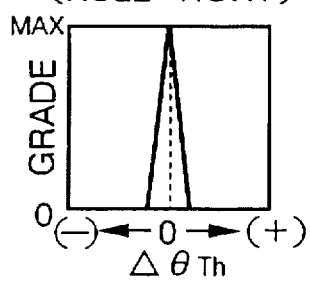
FIG. 20(a) is a diagram showing a membership function corresponding to a fuzzy rule of rule number 17 shown in FIG. 3.
FIG. 20(b) is a diagram showing a membership function corresponding to the fuzzy rule of rule number 17 shown in FIG. 3.
FIG. 20(c) is a diagram showing a membership function corresponding to the fuzzy rule of rule number 17 shown in FIG. 3.
FIG. 20(d) is a diagram showing a membership function corresponding to the fuzzy rule of rule number 17 shown in FIG. 3.
Figure 20:
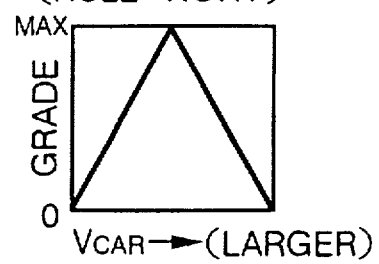
Figure 20:
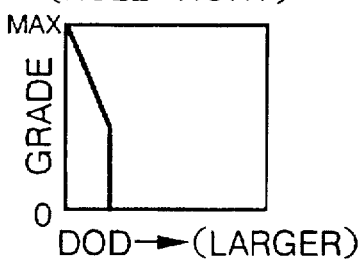
Figure 20:
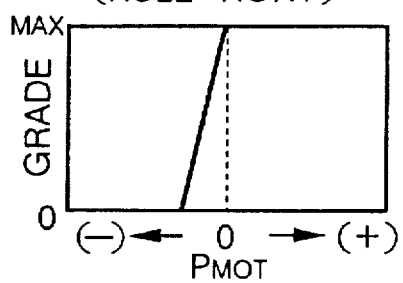
Figure 21:
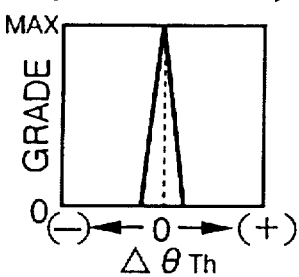
FIG. 21(a) is a diagram showing a membership function corresponding to a fuzzy rule of rule number 18 shown in FIG. 3.
FIG. 21(b) is a diagram showing a membership function corresponding to the fuzzy rule of rule number 18 shown in FIG. 3.
FIG. 21(c) is a diagram showing a membership function corresponding to the fuzzy rule of rule number 18 shown in FIG. 3.
FIG. 21(d) is a diagram showing a membership function corresponding to the fuzzy rule of rule number 18 shown in FIG. 3.
Figure 21:
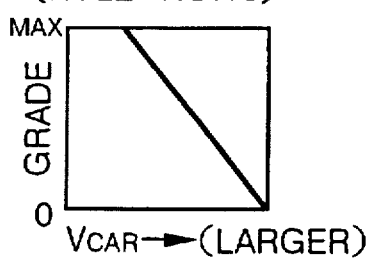
Figure 21:
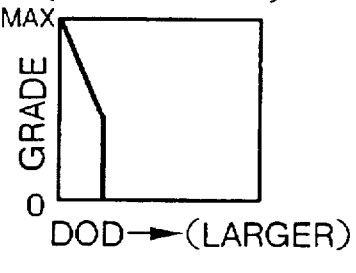
Figure 21:
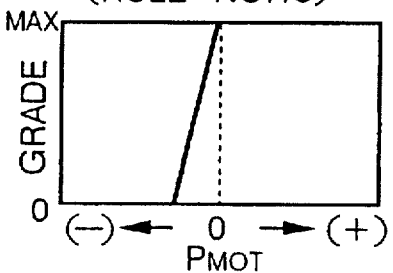
Figure 23:
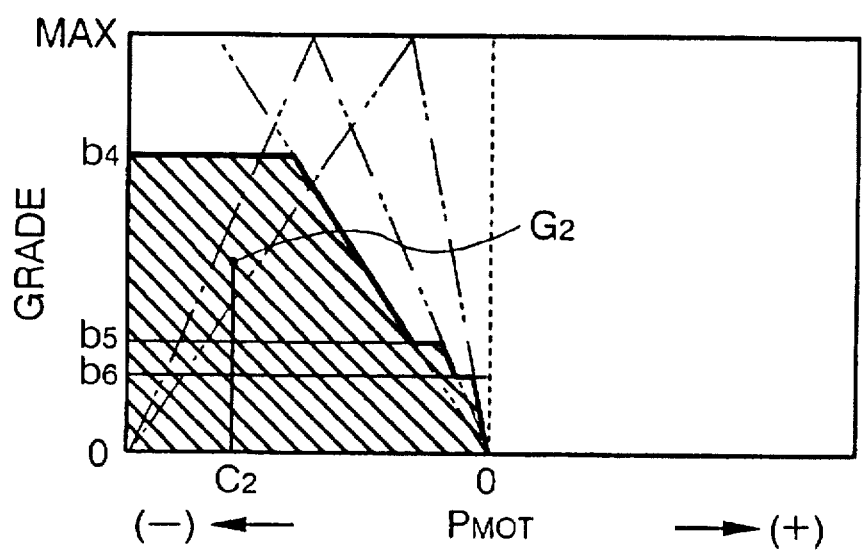
FIG. 23 is a diagram illustrative of an operation of the control system shown in FIG. 1.
Figure 27:
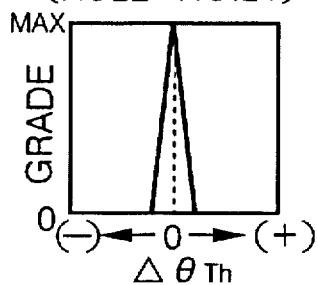
FIG. 27(a) is a diagram showing a membership function corresponding to a fuzzy rule of rule number 21 shown in FIG. 24.
FIG. 27(b) is a diagram showing a membership function corresponding to the fuzzy rule of rule number 21 shown in FIG. 24.
FIG. 27(c) is a diagram showing a membership function corresponding to the fuzzy rule of rule number 21 shown in FIG. 24.
FIG. 27(d) is a diagram showing a membership function corresponding to the fuzzy rule of rule number 21 shown in FIG. 24.
FIG. 27(e) is a diagram showing a membership function corresponding to the fuzzy rule of rule number 21 shown in FIG. 24.
Figure 27:
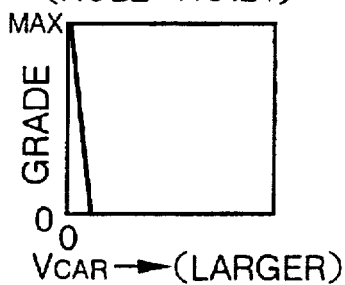
Figure 27:
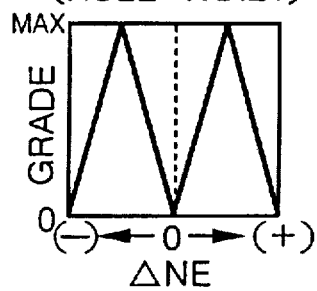
Figure 27:
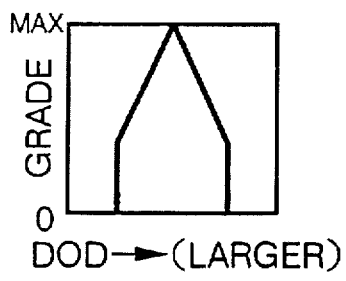
Figure 27:
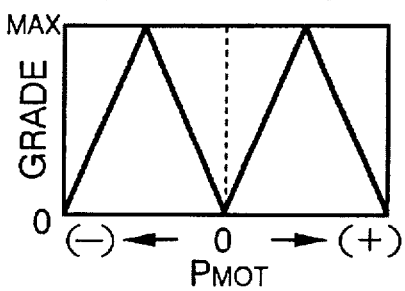
Figure 28:
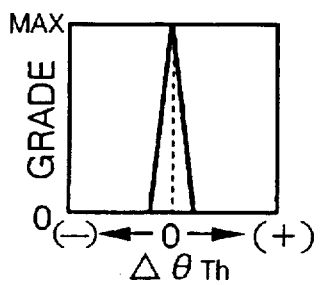
FIG. 28(a) is a diagram showing a membership function corresponding to a fuzzy rule of rule number 22 shown in FIG. 24.
FIG. 28(b) is a diagram showing a membership function corresponding to the fuzzy rule of rule number 22 shown in FIG. 24.
FIG. 28(c) is a diagram showing a membership function corresponding to the fuzzy rule of rule number 22 shown in FIG. 24.
FIG. 28(d) is a diagram showing a membership function corresponding to the fuzzy rule of rule number 22 shown in FIG. 24.
FIG. 28(e) is a diagram showing a membership function corresponding to the fuzzy rule of rule number 22 shown in FIG. 24.
Figure 28:
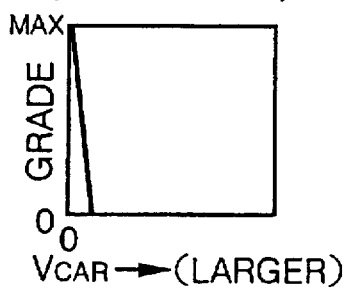
Figure 28:
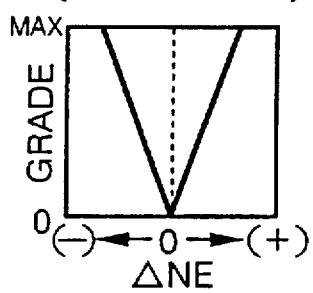
Figure 28:
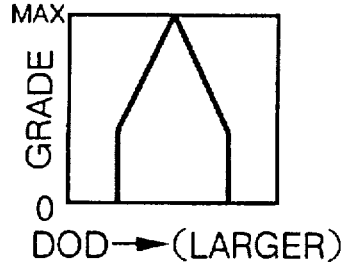
Figure 28:
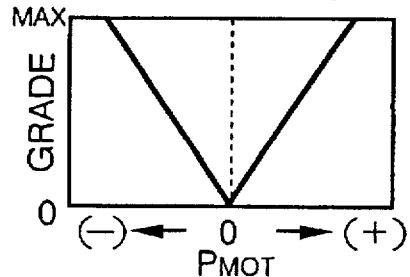
Figure 29:
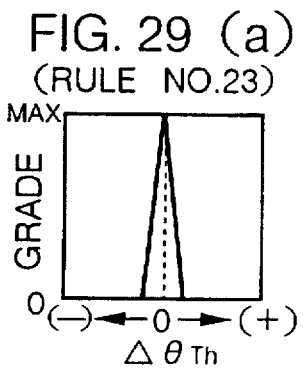
FIG. 29(a) is a diagram showing a membership function corresponding to a fuzzy rule of rule number 23 shown in FIG. 24.
FIG. 29(b) is a diagram showing a membership function corresponding to the fuzzy rule of rule number 23 shown in FIG. 24.
FIG. 29(c) is a diagram showing a membership function corresponding to the fuzzy rule of rule number 23 shown in FIG. 24.
FIG. 29(d) is a diagram showing a membership function corresponding to the fuzzy rule of rule number 23 shown in FIG. 24.
FIG. 29(e) is a diagram showing a membership function corresponding to the fuzzy rule of rule number 23 shown in FIG. 24.
Figure 29:
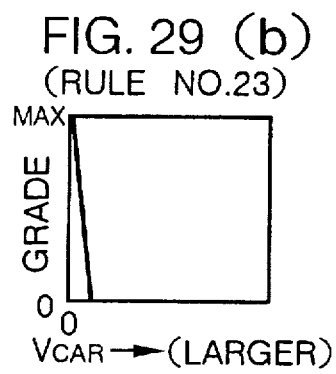
Figure 29:
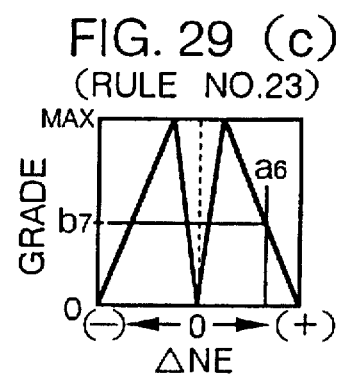
Figure 29:
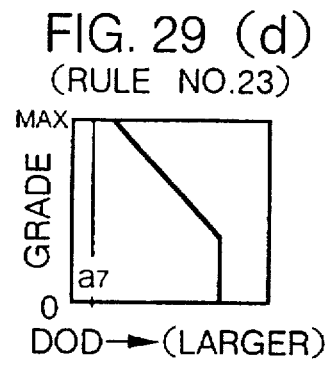
Figure 29:
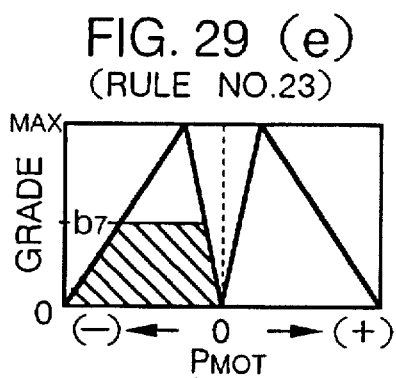
Figure 30:
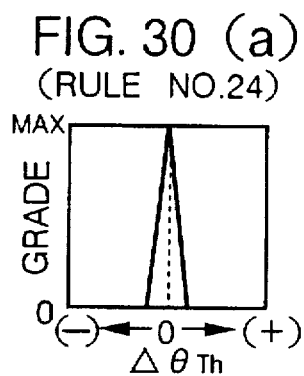
FIG. 30(a) is a diagram showing a membership function corresponding to a fuzzy rule of rule number 24 shown in FIG. 24.
FIG. 30(b) is a diagram showing a membership function corresponding to the fuzzy rule of rule number 24 shown in FIG. 24.
FIG. 30(c) is a diagram showing a membership function corresponding to the fuzzy rule of rule number 24 shown in FIG. 24.
FIG. 30(d) is a diagram showing a membership function corresponding to the fuzzy rule of rule number 24 shown in FIG. 24.
FIG. 30(e) is a diagram showing a membership function corresponding to the fuzzy rule of rule number 24 shown in FIG. 24.
Figure 30:
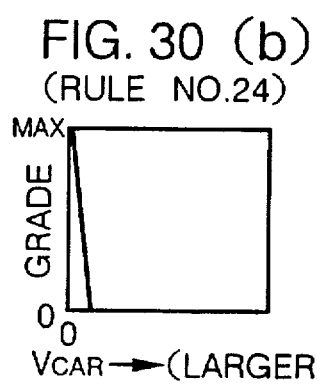
Figure 30:
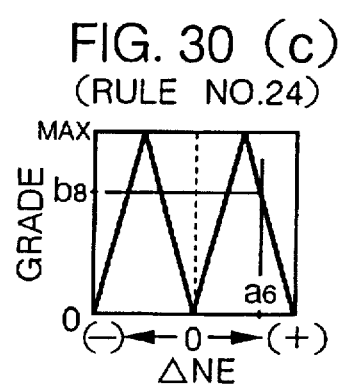
Figure 30:
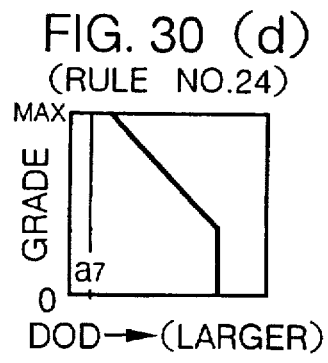
Figure 30:
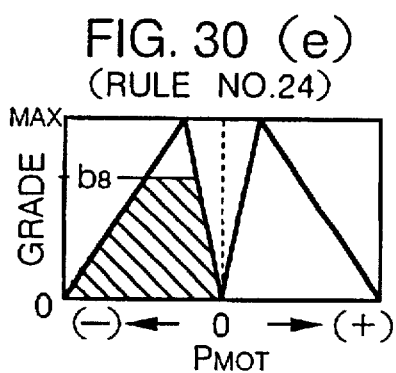

As shown in FIGS. 16(a), 16(b), 16(c), 16(d) through 18(a), 18(b), 18(c), 18(d), when detected values of the rate of change ΔΘth, the vehicle speed VCAR, and the depth-of-discharge DOD are ΔΘth=a3=0, VCAR=A4, and DOD=a5, since the general goodnesses of fit with respect to the fuzzy rules of rule numbers 13~15 are indicated by b4, b5, b6, respectively (the general goodnesses of fit corresponding to the other fuzzy rules are "0"), portions of the membership functions of the output power PMOT according to these fuzzy rules below the general goodnesses b4, b5, b6 of fit are shown hatched in FIGS. 16(d), 17(d), 18(d), and these hatched portions are extracted. The goodness-of-fit combiner 41 then overlaps the extracted portions, producing a combined function shown in FIG. 23, determines a center of gravity G2 of the combined function, and determines a value c2 (<0) of the output power PMOT corresponding to the center of gravity G1 as an output power (regenerated power) to be produced by the electric motor 2. Since the general goodness of fit corresponding to the fuzzy rule of rule number 13 is highest, the determined output power PMOT=c2 is relatively large for the electric motor 2 to generate regenerative electric energy.

Having determined the output power PMOT of the electric motor 2 according to the fuzzy inference process, the motor controller 8 controls, through the PDU 21, an amount of electric energy supplied from the storage battery 5 to the electric motor 2 or a generated amount of electric energy from the electric motor 2 to the storage battery 5 such that an actual output power of the electric motor 2 as recognized by signals from the sensors 22, 23, i.e., current and voltage signals of the electric motor 2, will be equalized to the determined output power PMOT.

The electric motor 2 thus controlled is capable of generating assistive drive forces or generating regenerative electric energy accurately depending on the accelerated/decelerated state of the hybrid vehicle and the stored energy of the storage battery 5.

For example, if the rate of change ΔΘth has a large positive value indicating a higher demanded acceleration degree when the depth-of-discharge DOD of the storage battery 5 is not substantially large indicating that the stored energy of the storage battery 5 is relatively large, then since the general goodness of fit of the fuzzy rule of rule number 1 is increased, the output power PMOT of the electric motor 2 becomes relatively large for producing assistive drive forces. Because the output power PMOT of the electric motor 2 is applied together with the output power of the engine 1 to the drive wheel 6, the drive wheel 6 can produce large accelerating forces.

If the rate of change ΔΘth has a large negative value indicating a higher demanded deceleration degree when the depth-of-discharge DOD of the storage battery 5 is relatively large indicating that the stored energy of the storage battery 5 is relatively small, then since the general goodness of fit of the fuzzy rule of rule number 7 is increased, the output power PMOT of the electric motor 2 becomes relatively large for producing regenerative electric energy. Because the regenerative output power PMOT, i.e., regenerative braking forces, of the electric motor 2 is applied to the drive wheel 6, the drive wheel 6 can produce large decelerating forces (braking forces). At the same time, the storage battery 5 is efficiently charged with relatively large regenerative electric energy.

If the depth-of-discharge DOD of the storage battery 5 is large indicating that the stored energy of the storage battery 5 is small when the hybrid vehicle is accelerated, then since the general goodness of fit of any one of the fuzzy rules of rule numbers 4~6 is increased, the output power PMOT of the electric motor 2 for producing assistive drive forces is reduced, so that the stored energy of the storage battery 5 is prevented from being excessively consumed.

If the depth-of-discharge DOD of the storage battery 5 is small indicating that the stored energy of the storage battery 5 is large when the hybrid vehicle is decelerated, then since the general goodness of fit of any one of the fuzzy rules of rule numbers 10~12 is increased, the output power PMOT of the electric motor 2 for producing regenerative electric energy is reduced, so that the storage battery 5 is prevented from being excessively charged.

If the depth-of-discharge DOD of the storage battery 5 is relatively large indicating that the stored energy of the storage battery 5 is relatively small when the hybrid vehicle is cruising, then since the general goodness of fit of any one of the fuzzy rules of rule numbers 13–15 is increased, the electric motor 2 is operated in the regenerative mode to charge the storage battery 5. Inasmuch as the regenerative output power PMOT of the electric motor 2 is greater at this time as the cruising speed VCAR is higher and the output power of the engine 1 is greater, it is possible to charge the storage battery 5 efficiently while the output power of the engine 1 is being efficiently utilized. If the storage battery 5 is in a nearly fully charged state while the hybrid vehicle is cruising, then since the general goodnesses of fit of the fuzzy rules of rule numbers 16–18 are increased, the regenerative output power PMOT of the electric motor 2 is suppressed, preventing the storage battery 5 from being excessively charged.

Inasmuch as the operating state (the output power PMOT) thus determined of the electric motor 2 is determined in view of various accelerated/decelerated states of the hybrid vehicle and stored energy states of the storage battery 5, when the present accelerated/decelerated state of the hybrid vehicle is abruptly changed, the operating state of the electric motor 2 is changed smoothly. Therefore, the electric motor 2 does not produce excessive accelerating forces or braking forces, or the storage battery 5 is not abruptly charged or discharged, so that the hybrid vehicle can smoothly change its running behavior and the storage battery 5 can smoothly be charged and discharged.

Operation of the hybrid vehicle while the engine 1 is idling will be described below.

When the engine 1 is idling while the hybrid vehicle is stopped or parked, the engine 1 is basically controlled to operate at a predetermined rotational speed of 750 rpm, for example, by the engine controller 7. However, the rotational speed of the engine 1 may vary due to various causes of load fluctuations, and such rotational speed variations are not preferable for the emission performance and vibration performance of the engine 1. With the hybrid vehicle according to this embodiment, rotational speed variations of the engine 1 while the engine 1 is idling are suppressed by the operation of the electric motor 2 to generate assistive drive forces or regenerative electric energy. In order to control the electric motor 2 according to a fuzzy inference process when the engine 1 is idling in the same manner as when the hybrid vehicle is running, the memory 39 stores a plurality of fuzzy rules shown in FIG. 24 and a plurality of membership functions shown in FIGS. 25(a), 25(b), 25(c), 25(d), 25(e) through FIGS. 30(a), 30(b), 30(c), 30(d), 30(e) which correspond to the fuzzy rules.

The fuzzy rules shown in FIG. 24 prescribe operating states of the electric motor 3 with respect to various accelerated/decelerated states of the hybrid vehicle and stored energy states of the storage battery 5 while the engine 1 is idling, the accelerated/decelerated states and the stored energy states being defined as premises and the operating states of the electric motor 3 as conclusions.

According to these fuzzy rules, a rotational speed fluctuating state of the engine 1 while it is idling is represented by the magnitude of a positive value (increasing) or a negative value (decreasing) of the rotational speed change $\Delta NE$ of the engine 1 when the rate of change $\Delta\theta th$ and the vehicle speed VCAR are substantially "0". A stored energy state of the storage battery 5 and an operating state of the electric motor 2 are represented respectively by the magnitude of the depth-of-discharge DOD of the storage battery 5 and the magnitude of a positive or negative value of the output power PMOT of the electric motor 2, as is the case with the fuzzy rules shown in FIGS. 4(a) through 4(c). For example, according to the fuzzy rule of rule number 19 shown in FIG. 24, when the engine 1 is idling with the rate of change $\Delta\theta th$ and the vehicle speed VCAR being substantially "0" and the depth-of-discharge DOD of the storage battery 5 is large (the stored energy is small), the output power PMOT of the electric motor 2 is made small with a polarity opposite to the polarity of the rotational speed change $\Delta NE$ (PMOT<0 if $\Delta NE>0$, PMOT>0 if $\Delta NE<0$).

According to this fuzzy rule, basically, when the rotational speed change $\Delta NE$ of the engine 1 is of a positive value (when the rotational speed increases), the output power PMOT of the electric motor 2 is made negative, indicating that the electric motor 2 operates in the regenerative mode to generate regenerative electric energy, and when the rotational speed change $\Delta NE$ of the engine 1 is of a negative value (when the rotational speed decreases), the output power PMOT of the electric motor 2 is made positive, indicating that the electric motor 2 operates in the motor mode to generate assistive drive forces. When the depth-of-discharge DOD of the storage battery 5 is medium (the stored energy is medium) as with the fuzzy rules of rule numbers 20–22, the output power PMOT of the electric motor 2 is made larger negatively or positively as rotational speed change $\Delta NE$ of the engine 1 is larger positively or negatively. When the rotational speed of the engine 1 varies while the depth-of-discharge DOD of the storage battery 5 is large (the stored energy is small) or depth-of-discharge DOD of the storage battery 5 is small (the stored energy is large) as with the fuzzy rules of rule numbers 19, 23, 24, the output power PMOT of the electric motor 2 is made smaller with a polarity opposite to the polarity of the rotational speed change $\Delta NE$.

The membership functions shown in FIGS. 25(a), 25(b), 25(c), 25(d), 25(e)–30(a), 30(b), 30(c), 30(d), 30(e) are established so as to correspond to the fuzzy rules shown in FIG. 24. As with the membership functions shown in FIGS. 4(a), 4(b), 4(c)–21(a), 21(b), 21(c), the membership functions here define the relationship between values of the rate of change $\Delta\theta th$, the vehicle speed VCAR, the depth-of-discharge DOD, and the output power PMOT in the fuzzy rules and grades thereof (goodness of fit) and, in addition, the rotational speed change $\Delta NE$. Specifically, the membership functions corresponding to the fuzzy rules express the magnitudes of the rate of change $\Delta\theta th$, the vehicle speed VCAR, the depth-of-discharge DOD, the rotational speed change $\Delta NE$, and the output power PMOT in the fuzzy rules of rule numbers 19–24 in terms of grades thereof depending on their values. The membership functions express the magnitudes of the rate of change $\Delta\theta th$, the vehicle speed VCAR, the depth-of-discharge DOD, the rotational speed change $\Delta NE$, and the output power PMOT in the fuzzy rules with grades depending on their values.

Using the above fuzzy rules and membership functions, the motor controller 8 determines the output power PMOT of the electric motor 2 according to a fuzzy inference process from actually detected values of the rate of change $\Delta\theta th$, the vehicle speed VCAR, the rotational speed change $\Delta NE$, and the depth-of-discharge DOD that are supplied from the engine controller 7 and the battery controller 10, as while the hybrid vehicle is running.

In the motor controller 8, the goodness-of-fit calculator 40 determines grades (goodness of fit) of detected values of the rate of change $\Delta\theta$th, the vehicle speed VCAR, the depth-of-discharge DOD, and the rotational speed change $\Delta$NE based on the membership functions corresponding to each of the fuzzy rules. The motor controller 8 then determines a minimum one of the determined grades as a general goodness of fit in the fuzzy rule. From the general goodnesses of fit thus determined with respect to the fuzzy rules and the membership functions of the output power PMOT of the electric motor 2 for the fuzzy rules, the motor controller 8 extracts and combines portions of the membership functions below the goodnesses of fit, determines the center of gravity of the combined data, and determines a value of the output power PMOT at the determined center of gravity as an output power to be produced by the electric motor 2.

Specifically, as shown in FIGS. 29(a), 29(b), 29(c), 29(d), 29(e) through 30(a), 30(b), 30(c), 30(d), 30(e), when detected values of the rotational speed change $\Delta$NE and the depth-of-discharge DOD are $\Delta$NE=a6 (>0) and DOD=a7 ($\approx$0) while the engine 1 is idling with detected values of the rate of change $\Delta\theta$th and the vehicle speed VCAR being "0", indicating that a rotational speed variation of the engine 1 is developed with an increase in the rotational speed and the depth-of-discharge DOD is sufficiently small, grades b7, b8 with respect to the detected value a6 of the rotational speed change $\Delta$NE for the fuzzy rules of rule numbers 23, 24 are smaller than a grade (=MAX) with respect to the detected value a7 of the depth-of-discharge DOD and the detected values (=0) of the rate of change $\Delta\theta$th and the vehicle speed VCAR. In this case, the general goodnesses of fit with respect to the fuzzy rules of rule numbers 23, 24 are indicated by b7, b8, respectively. For the fuzzy rules of rule numbers 19–23, a grade with respect to the detected value a7 of the depth-of-discharge DOD is "0", and hence the general goodnesses of fit with respect to these fuzzy rules are all "0".

Figure 31:
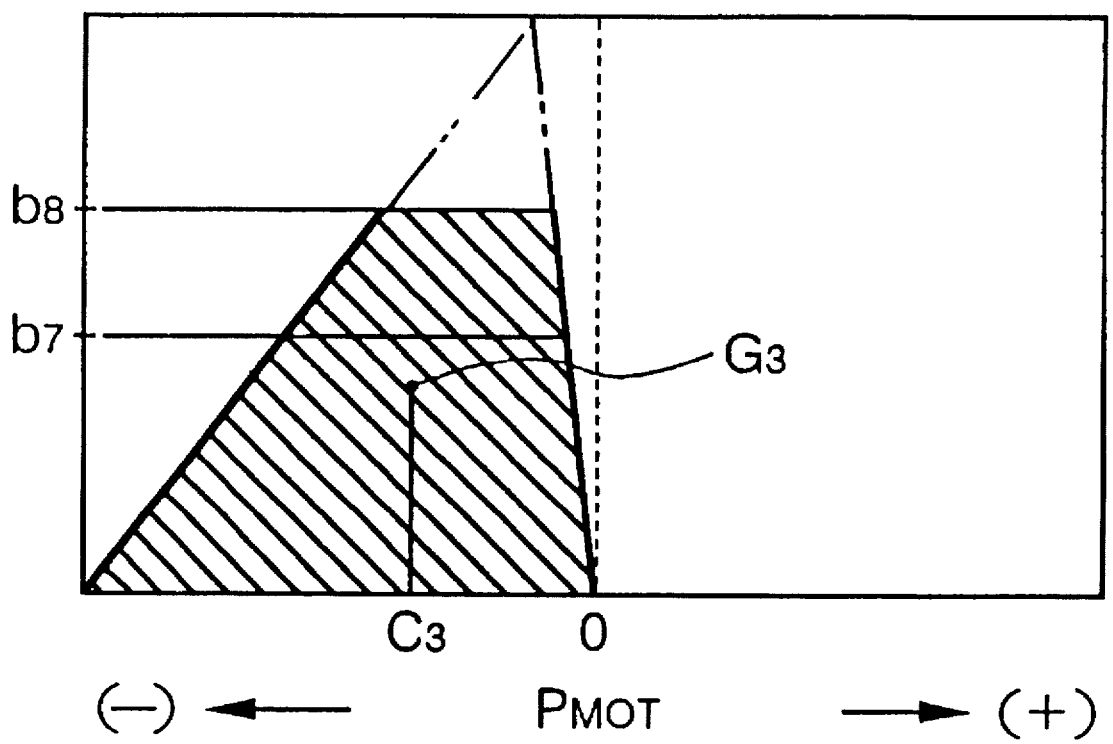
FIG. 31 is a diagram illustrative of an operation of the control system shown in FIG. 1.

Portions of the membership functions, which are negative, of the output power PMOT according to the fuzzy rules of rule numbers 23, 24 below the general goodnesses b7, b8 of fit are shown hatched in FIGS. 29(e) and 30(e), and these hatched portions are extracted. The goodness-of-fit combiner 41 then overlaps the extracted portions, producing a combined function shown in FIG. 31, determines a center of gravity G3 of the combined function, and determines a value c3 (<0) of the output power PMOT corresponding to the center of gravity G3 as an output power to be produced by the electric motor 2. Since the rotational speed change $\Delta$NE is positive indicating that the rotational speed of the engine 1 increases, the output power PMOT=c3 thus determined is of a medium value for the electric motor 2 to generate regenerative electric energy (PMOT<0), i.e., to suppress an increase in the rotational speed of the engine 1.

Having determined the output power PMOT of the electric motor 2 according to the fuzzy inference process, the motor controller 8 controls, through the PDU 21, an amount of electric energy supplied from the storage battery 5 to the electric motor 2 or a generated amount of electric energy from the electric motor 2 to the storage battery 5 such that an actual output power of the electric motor 2 as recognized by signals from the sensors 22, 23, i.e., current and voltage signals of the electric motor 2, will be equalized to the determined output power PMOT, in the same manner as when the hybrid vehicle is running.

The electric motor 2 thus controlled while the engine 1 is idling is capable of smoothly suppressing rotational speed variations of the engine 1 while preventing the storage battery 5 from being excessively discharged or charged.

Specifically, when the rotational speed of the engine 1 increases while the engine 1 is idling ($\Delta$NE>0), since the output power PMOT of the electric motor 2 is controlled for regenerative braking (PMOT<0), braking forces are applied to the output shaft (crankshaft) of the engine 1 to reduce the rotational speed thereof. Conversely, when the rotational speed of the engine 1 decreases while the engine 1 is idling ($\Delta$NE<0), since the output power PMOT of the electric motor 2 is controlled for generating assistive drive forces (PMOT>0), drive forces are applied to the output shaft (crankshaft) of the engine 1 to increase the rotational speed thereof. Therefore, rotational speed variations of the engine 1 are suppressed. As can be seen from the fuzzy rules of rule numbers 20–22, inasmuch as the value of the output power PMOT of the electric motor 2 has its magnitude basically depending on the magnitude of the rotational speed change $\Delta$NE of the engine 1, it is possible to sufficiently reduce rotational speed variations of the engine 1. Furthermore, because the output power PMOT of the electric motor 2 for suppressing rotational speed variations of the engine 1 is determined by the fuzzy inference process, the output power PMOT of the electric motor 2 is smoothly varied with respect to rotational speed variations of the engine 1, thus eliminating situations where the rotational speed of the engine 1 would become unstable due to an abrupt change in the output power PMOT of the electric motor 2.

If the depth-of-discharge DOD of the storage battery 5 is small with the storage battery 5 being nearly fully charged or the depth-of-discharge DOD of the storage battery 5 is large with the stored energy being small, then since the output power PMOT of the electric motor 2 for suppressing the rotational speed of the engine 1 is limited so as to be smaller by the fuzzy rules of rule numbers 19, 23, 24, the storage battery 5 is prevented from being excessively charged by regenerative operation of the electric motor 2 while the storage battery 5 is fully charged, and the stored energy of the storage battery 5 is prevented from being excessively consumed by the generation of assistive drive forces while the stored energy of the storage battery 5 is small.

The hybrid vehicle according to this embodiment is thus capable of smoothly suppressing rotational speed variations of the engine 1 while the engine 1 is idling, while at the same time smoothly varying the operating state of the electric motor 2, and operating the electric motor 2 for suppressing rotational speed variations of the engine 1 efficiently in a state of balance with the stored energy state of the storage battery 5.

Simulations of specific operations of the electric motor 2 and the storage battery 5 on the hybrid vehicle will be described below with reference to FIGS. 32(a), 32(b), 32(c) and 33(a), 33(b).

Figure 32:
FIG. 32(a) is a diagram illustrative of an operating state of the hybrid vehicle system shown in FIG. 1 while it is running.
FIG. 32(b) is a diagram illustrative of an operating state of the hybrid vehicle system shown in FIG. 1 while it is running.
FIG. 32(c) is a diagram illustrative of an operating state of the hybrid vehicle system shown in FIG. 1 while it is running.
Figure 32:
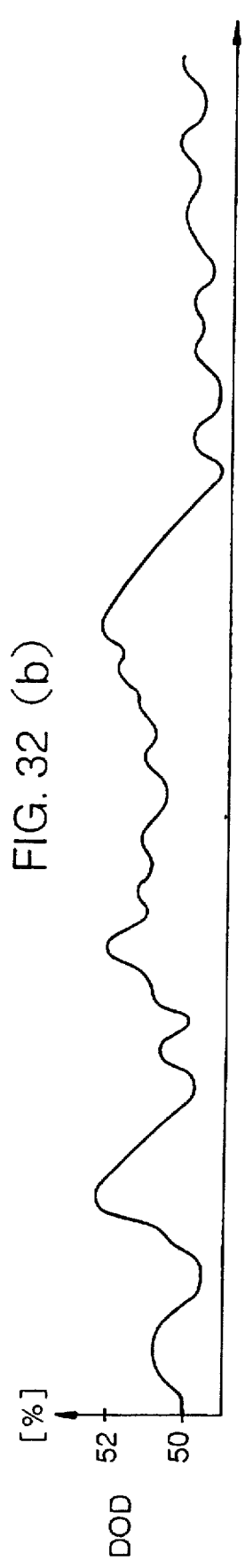
Figure 32:
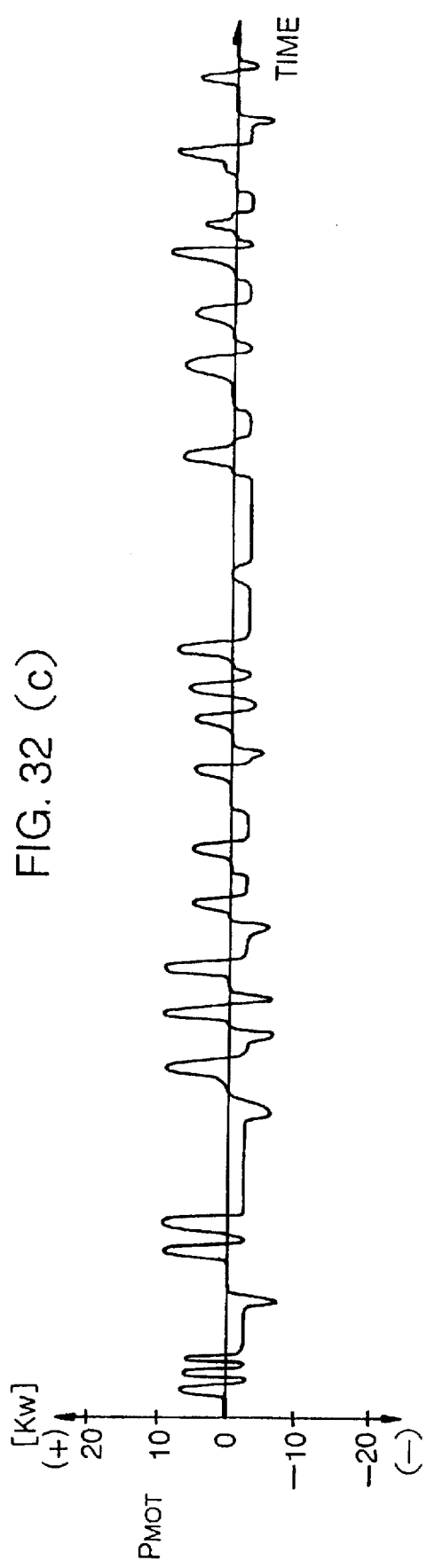

FIG. 32(a) shows changes over time in the vehicle speed VCAR at which the hybrid vehicle has traveled, and FIGS. 32(b) and 32(c) show simulated changes in the depth-of-discharge DOD and the output power PMOT of the electric motor 2 when the vehicle speed VCAR changes as shown in FIG. 32(a).

As shown in FIGS. 32(a) and 32(c), the electric motor 2 generates assistive drive forces (PMOT>0) when the hybrid vehicle is accelerated, and operates in the regenerative mode (PMOT<0) when the hybrid vehicle is decelerated or cruising. The output power PMOT of the electric motor 2 does not abruptly change, but smoothly changes.

As shown in FIG. 32(b), when the electric motor 2 generates assistive drive forces, the depth-of-discharge DOD of the storage battery 5 increases, and the stored energy of the storage battery 5 is consumed. When the electric motor 2 operates in the regenerative mode, the depth-of-discharge DOD of the storage battery 5 decreases, and the storage battery 5 is charged. The depth-of-discharge DOD of the storage battery 5 does not abruptly change, but smoothly changes.

The hybrid vehicle according to the present embodiment can accurately obtain assistive drive forces or regenerative electric energy from the electric motor 2 which matches the accelerated/decelerated state of the hybrid vehicle and the stored energy state of the storage battery 5, while keeping the operating state of the electric motor 2 and the stored energy state of the storage battery 5 in balance. At the same time, the hybrid vehicle can smoothly change its running behavior and the storage battery 5 can smoothly be charged and discharged.

Figure 33:
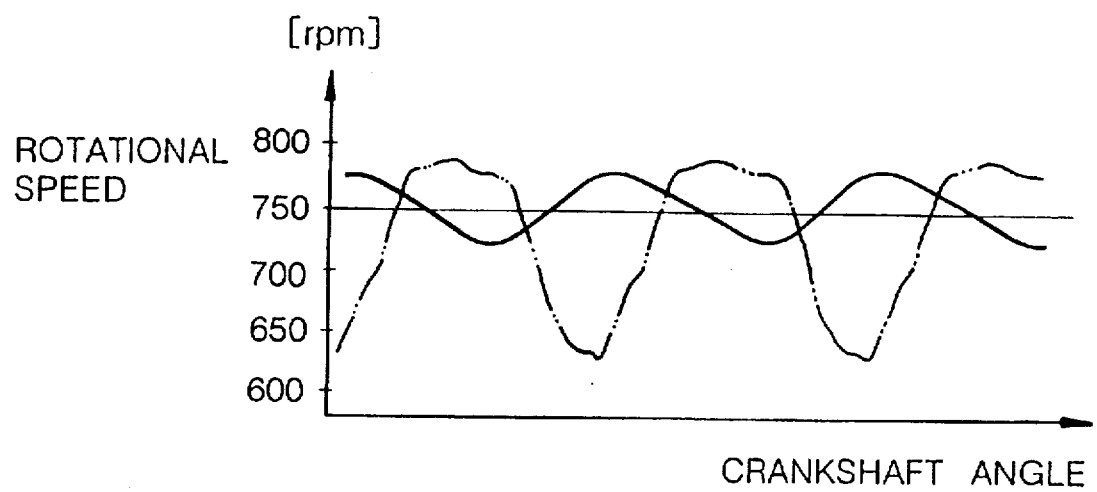
FIG. 33(a) is a diagram illustrative of an operating state of the hybrid vehicle system shown in FIG. 1 while it is idling.
FIG. 33(b) is a diagram illustrative of an operating state of the hybrid vehicle system shown in FIG. 1 while it is idling.
Figure 33:
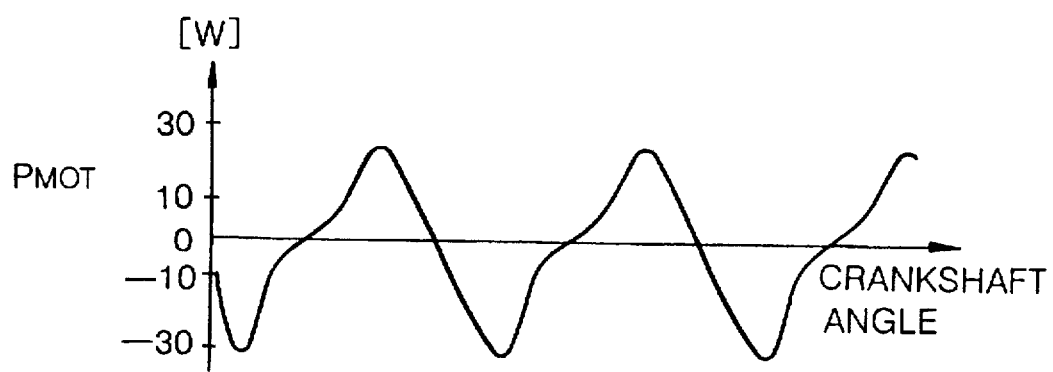

FIG. 33(a) shows how the rotational speed of engine 1 varies, as indicated by the imaginary-line curve, if the electric motor 2 were not controlled according to the illustrated embodiment, i.e., if the electric motor 2 were not operated in the motor mode or regenerative mode, while the engine 1 is idling. FIGS. 33(a) and 33(b) show how the rotational speed of the engine 1 varies and the output power PMOT of the electric motor 2 varies, as indicated by the solid-line curves, if the electric motor 2 is controlled according to the illustrated embodiment.

The solid-line curves shown in FIGS. 33(a) and 33(b) indicate that the electric motor 2 operates in the regenerative mode (PMOT<0) when the rotational speed of the engine 1 increases, and generates assistive drive forces (PMOT>0) when the rotational speed of the engine 1 decreases, with the result that rotational speed variations of the engine 1 are suppressed. A comparison between the solid-line curve and the imaginary-line curve in FIG. 33(a) shows that rotational speed variations of the engine 1 are sufficiently suppressed according to the illustrated embodiment. According to the illustrated embodiment, as can be understood from the solid-line curves shown in FIGS. 33(a) and 33(b), the output power PMOT of the electric motor 2 changes smoothly, but not abruptly, and rotational speed variations of the engine 1 are suppressed smoothly and stably.

In the illustrated embodiment, an accelerated/decelerated state of the hybrid vehicle is recognized in terms of the rate of change Δθth and the vehicle speed VCAR only. However, the opening of the throttle valve of the engine 1 may be detected, and an accelerated/decelerated state of the hybrid vehicle may be recognized in terms of the magnitude of the opening of the throttle valve. For example, an acceleration degree demanded on the hybrid vehicle is determined as larger if the opening of the throttle valve is larger.

In the illustrated embodiment, for an idling state of the engine 1, fuzzy rules and membership functions are established primarily for the purpose of suppressing rotational speed variations of the engine 1. However, insofar as the stored energy of the storage battery 1 is not so large, fuzzy rules and membership functions may be added to make the output power PMOT relatively small in the regenerative mode (PMOT<0) for an idling state of the engine 1, so that while the engine 1 is idling, the electric motor 2 operates more in the regenerative mode for positively charging the storage battery 2.

While the storage battery 5 is used as an energy storage unit, a large-capacity capacitor such as an electric double-layer capacitor may be used as an energy storage unit.

In the illustrated embodiment, an idling state of the engine 1 is detected when detected values of the rate of change Δθth and the vehicle speed VCAR are "0". However, the opening of the throttle valve of the engine 1 may be detected, and the engine 1 may be detected as idling when the detected opening of the throttle valve reaches a predetermined opening and the vehicle speed VCAR is "0".

Although a certain preferred embodiment of the present invention have been shown and described in detail, it should be understood that various changes and modifications may be made therein without departing from the scope of the appended claims.

What is claimed is:

1. A control system in a hybrid vehicle having an engine for producing propulsive forces, an electric motor for selectively generating assistive drive forces in addition to the propulsive forces and electric energy converted from the propulsive forces, and an energy storage unit for selectively supplying electric energy to the electric motor and storing electric energy converted by the electric motor, comprising:

accelerated/decelerated state detecting means for detecting an accelerated/decelerated state of the hybrid vehicle;

fuzzy inference memory means for storing a plurality of fuzzy rules and membership functions to determine an operating state of the electric motor from the accelerated/decelerated state according to a fuzzy inference process;

goodness-of-fit calculating means for determining respective goodnesses of fit of said fuzzy rules based on said membership functions from the accelerated/decelerated state as detected by said accelerated/decelerated state detecting means;

goodness-of-fit combining means for combining the goodnesses of fit as determined by said goodness-of-fit calculating means to determine an operating state of the electric motor; and motor control means for controlling the electric motor based on the operating state of the electric motor as determined by said goodness-of-fit combining means.

2. A control system according to claim 1, wherein said accelerated/decelerated state detecting means comprises at least one of:

throttle-valve-opening detecting means for detecting an opening of a throttle valve of the engine;

throttle-valve-opening rate-of-change detecting means for detecting a rate of change of the opening of the throttle valve; and vehicle speed detecting means for detecting a vehicle speed of the hybrid vehicle;

whereby the accelerated/decelerated state can be detected by said at least one of the throttle-valve-opening detecting means, the throttle-valve-opening rate-of-change detecting means, and the vehicle speed detecting means.

3. A control system according to claim 1 or 2, wherein said accelerated/decelerated state as detected by said accelerated/decelerated state detecting means includes acceleration and deceleration degrees demanded on the hybrid vehicle, and wherein said fuzzy rules include:

fuzzy rules for increasing the assistive drive forces generated by said electric motor as the acceleration degree is larger; and fuzzy rules for increasing the electric energy generated by said electric motor as the deceleration degree is larger.

4. A control system according to claim 1 or 2, wherein said accelerated/decelerated state as detected by said accelerated/decelerated state detecting means includes a vehicle speed of the hybrid vehicle when the hybrid vehicle is substantially cruising, and wherein said fuzzy rules include:

fuzzy rules for increasing the electric energy generated by said electric motor as the vehicle speed is larger.

5. A control system according to claim 1 or 2, further comprising stored energy detecting means for detecting an amount of stored energy of said energy storage unit, wherein said fuzzy rules and said membership functions stored in said fuzzy inference memory means include fuzzy rules and membership functions for determining the operating state of the electric motor corresponding to the detected amount of stored energy, and wherein said goodness-of-fit calculating means comprises means for determining the goodnesses of fit of said fuzzy rules based on said membership functions from the accelerated/decelerated state as detected by said accelerated/decelerated state detecting means and the amount of stored energy as detected by said stored energy detecting means.

6. A control system according to claim 5, wherein the fuzzy rules stored in said fuzzy inference memory means so as to correspond to the amount of stored energy of said energy storage unit include fuzzy rules for either reducing the assistive drive forces generated by said electric motor or increasing the electric energy generated by said electric motor as the amount of stored energy of said energy storage unit is small.

7. A control system according to claim 3, wherein said accelerated/decelerated state as detected by said accelerated/decelerated state detecting means includes a vehicle speed of the hybrid vehicle when the hybrid vehicle is substantially cruising, and wherein said fuzzy rules include:

fuzzy rules for increasing the electric energy generated by said electric motor as the vehicle speed is larger.

8. A control system according to claim 3, further comprising stored energy detecting means for detecting an amount of stored energy of said energy storage unit, wherein said fuzzy rules and said membership functions stored in said fuzzy inference memory means include fuzzy rules and membership functions for determining the operating state of the electric motor corresponding to the detected amount of stored energy, and wherein said goodness-of-fit calculating means comprises means for determining the goodnesses of fit of said fuzzy rules based on said membership functions from the accelerated/decelerated state as detected by said accelerated/decelerated state detecting means and the amount of stored energy as detected by said stored energy detecting means.

9. A control system according to claim 8, wherein the fuzzy rules stored in said fuzzy inference memory means so as to correspond to the amount of stored energy of said energy storage unit include fuzzy rules for either reducing the assistive drive forces generated by the electric motor or increasing the electric energy generated by the electric motor as the amount of stored energy of said energy storage unit is reduced.

10. A control system according to claim 4, further comprising stored energy detecting means for detecting an amount of stored energy of said energy storage unit, wherein said fuzzy rules and said membership functions stored in said fuzzy inference memory means include fuzzy rules and membership functions for determining the operating state of the electric motor corresponding to the detected amount of stored energy, and wherein said goodness-of-fit calculating means comprises means for determining the goodnesses of fit of said fuzzy rules based on said membership functions from the accelerated/decelerated state as detected by said accelerated/decelerated state detecting means and the amount of stored energy as detected by said stored energy detecting means.

11. A control system according to claim 10, wherein the fuzzy rules stored in said fuzzy inference memory means so as to correspond to the amount of stored energy of said energy storage unit include fuzzy rules for either reducing the assistive drive forces generated by said electric motor or increasing the electric energy generated by said electric motor as the amount of stored energy of said energy storage unit is reduced.

12. A control system in a hybrid vehicle having an engine for producing propulsive force, an electric motor for selectively generating assistive drive forces in addition to the propulsive forces and electric energy converted from the propulsive forces or regenerative braking of the hybrid vehicle, and an energy storage unit for selectively supplying electric energy to the electric motor and storing electric energy converted by the electric motor, comprising:

detecting means for detecting operating conditions of the hybrid vehicle;

fuzzy inference memory means for storing a plurality of fuzzy rules and membership functions relating to said operating conditions of the hybrid vehicle;

fuzzy inference processing means for calculating a desired operating state for the electric motor for providing an assistive drive force or an electrical energy generation of a calculated magnitude based on said hybrid vehicle operating conditions detected by said detecting means using said fuzzy rules and membership functions stored in said fuzzy inference memory means; and motor control means for controlling the electric motor based on said desired operating state of the electric motor as calculated by said fuzzy inference processing means.

13. A control system according to claim 12, wherein said detecting means comprises at least one of:

throttle-valve-opening detecting means for detecting an opening of a throttle valve of the engine;

throttle-valve-opening rate-of-change detecting means for detecting a rate of change of the opening of the throttle valve; and vehicle speed detecting means for detecting a vehicle speed of the hybrid vehicle.

14. A control system according to claim 12 or 13, wherein said operating conditions of the hybrid vehicle as detected by said detecting means includes a magnitude of acceleration and deceleration demanded on the hybrid vehicle, and wherein said fuzzy rules include:

fuzzy rules for increasing the assistive drive forces generated by the electric motor as the magnitude of acceleration increases; and fuzzy rules for increasing the electric energy generated by the electric motor as the magnitude of deceleration increases.

15. A control system according to claim 12 or 13, wherein said operating conditions of the hybrid vehicle as detected by said detecting means includes a vehicle speed and cruising condition of the hybrid vehicle, and wherein said fuzzy rules include:

fuzzy rules for increasing the electric energy generated by the electric motor as the vehicle speed increases while cruising.

16. A control system according to claim 12 or 13, further comprising stored energy detecting means for detecting an amount of stored energy of the energy storage unit, wherein said fuzzy rules and said membership functions stored in said fuzzy inference memory means include fuzzy rules and membership functions for calculating the desired operating state of the electric motor corresponding to the detected amount of stored energy.

17. A control system according to claim 16, wherein the fuzzy rules stored in said fuzzy inference memory means so as to correspond to the amount of stored energy of said energy storage unit include fuzzy rules for either reducing the assistive drive forces generated by the electric motor or increasing the electric energy generated by said electric motor as the amount of stored energy of said energy storage unit is small.

* * * * *